US008730925B2

(12) United States Patent
Frank et al.

(10) Patent No.: US 8,730,925 B2
(45) Date of Patent: May 20, 2014

(54) METHOD AND APPARATUS FOR GENERATING REFERENCE SIGNALS FOR ACCURATE TIME-DIFFERENCE OF ARRIVAL ESTIMATION

(75) Inventors: Colin D. Frank, Park Ridge, IL (US); Sandeep H. Krishnamurthy, Arlington Heights, IL (US); Kenneth A. Stewart, Grayslake, IL (US); Xiangyang Zhuang, Lake Zurich, IL (US); Robert T. Love, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 1040 days.

(21) Appl. No.: 12/756,777

(22) Filed: Apr. 8, 2010

(65) Prior Publication Data

US 2010/0260154 A1 Oct. 14, 2010

Related U.S. Application Data

(60) Provisional application No. 61/168,189, filed on Apr. 9, 2009.

(51) Int. Cl.
*H04J 3/00* (2006.01)
*H04L 12/26* (2006.01)
*H04J 3/06* (2006.01)
*H04J 3/16* (2006.01)
*H04W 24/00* (2009.01)

(52) U.S. Cl.
USPC ........... 370/336; 370/241; 370/350; 370/468; 455/456.1

(58) Field of Classification Search
CPC .............................. H04W 725/0446
USPC ................ 370/336, 468, 350, 241; 455/456.1
See application file for complete search history.

(56) References Cited

U.S. PATENT DOCUMENTS 4,631,543 A 12/1986 Brodeur
7,639,660 B2 12/2009 Kim et al.
(Continued)

FOREIGN PATENT DOCUMENTS

CN 1984476 A 6/2007
CN 101035379 A 9/2007
(Continued)

OTHER PUBLICATIONS

USPTO Patent Application Titled "Autonomous Muting Indication to Enable Improved Time Difference of Arrival Measurements" U.S. Appl. No. 12/573,456, filed Oct. 5, 2009.

(Continued)

*Primary Examiner* — Ian N Moore
*Assistant Examiner* — Kiet Tang

(57) ABSTRACT

A base station communicates a positioning reference signal (PRS) to wireless communication devices over a downlink in a wireless communication system by encoding a PRS into a first set of transmission resources, encoding other information into a second set of transmission resources, multiplexing the two sets of resources into a subframe such that the first set of resources is multiplexed into at least a portion of a first set of orthogonal frequency division multiplexed (OFDM) symbols based on an identifier associated with the base station and the second set of resources is multiplexed into a second set of OFDM symbols. Upon receiving the subframe, a wireless communication device determines which set of transmission resources contains the PRS based on the identifier associated with the base station that transmitted the subframe and processes the set of resources containing the PRS to estimate timing (e.g., time of arrival) information.

2 Claims, 14 Drawing Sheets

COSTAS BLOCK INTERLEAVING - 10 X 10 EXAMPLE

(56) References Cited

U.S. PATENT DOCUMENTS

| | | | |
|---|---|---|---|
| 7,940,740 | B2 | 5/2011 | Krishnamurthy et al. |
| 2001/0034238 | A1 | 10/2001 | Voyer |
| 2003/0222819 | A1 | 12/2003 | Karr et al. |
| 2005/0134456 | A1 | 6/2005 | Niu et al. |
| 2005/0135324 | A1 | 6/2005 | Kim et al. |
| 2006/0019677 | A1 | 1/2006 | Teague et al. |
| 2006/0181453 | A1* | 8/2006 | King et al. ............... 342/357.06 |
| 2006/0209754 | A1 | 9/2006 | Ji et al. |
| 2006/0256887 | A1 | 11/2006 | Kwon et al. |
| 2006/0291393 | A1 | 12/2006 | Teague et al. |
| 2007/0008108 | A1 | 1/2007 | Schurig et al. |
| 2007/0049280 | A1 | 3/2007 | Sambhwani et al. |
| 2007/0133462 | A1 | 6/2007 | Guey |
| 2007/0153743 | A1 | 7/2007 | Mukkavilli et al. |
| 2007/0211657 | A1 | 9/2007 | McBeath et al. |
| 2007/0223422 | A1 | 9/2007 | Kim et al. |
| 2007/0280160 | A1 | 12/2007 | Kim et al. |
| 2008/0002735 | A1 | 1/2008 | Poirier et al. |
| 2008/0014960 | A1 | 1/2008 | Chou |
| 2008/0089312 | A1 | 4/2008 | Malladi |
| 2008/0095109 | A1 | 4/2008 | Malladi et al. |
| 2008/0130626 | A1* | 6/2008 | Ventola et al. ............... 370/350 |
| 2008/0132247 | A1 | 6/2008 | Anderson |
| 2008/0133462 | A1 | 6/2008 | Aylward et al. |
| 2008/0159239 | A1 | 7/2008 | Odlyzko et al. |
| 2008/0167040 | A1 | 7/2008 | Khandekar et al. |
| 2008/0170602 | A1 | 7/2008 | Guey |
| 2008/0170608 | A1 | 7/2008 | Guey |
| 2008/0212520 | A1 | 9/2008 | Chen et al. |
| 2008/0232395 | A1 | 9/2008 | Buckley et al. |
| 2008/0267310 | A1 | 10/2008 | Khan et al. |
| 2008/0274753 | A1 | 11/2008 | Attar et al. |
| 2008/0307427 | A1 | 12/2008 | Pi et al. |
| 2009/0041151 | A1 | 2/2009 | Khan et al. |
| 2009/0061887 | A1 | 3/2009 | Hart et al. |
| 2009/0122758 | A1 | 5/2009 | Smith et al. |
| 2009/0228598 | A1 | 9/2009 | Stamoulis et al. |
| 2009/0238131 | A1 | 9/2009 | Montojo et al. |
| 2009/0252077 | A1 | 10/2009 | Khandekar et al. |
| 2009/0262699 | A1 | 10/2009 | Wengerter et al. |
| 2009/0268675 | A1 | 10/2009 | Choi |
| 2009/0270103 | A1 | 10/2009 | Pani et al. |
| 2009/0285321 | A1 | 11/2009 | Schulz et al. |
| 2010/0046460 | A1 | 2/2010 | Kwak et al. |
| 2010/0056166 | A1 | 3/2010 | Tenny |
| 2010/0103949 | A1* | 4/2010 | Jung et al. ............... 370/468 |
| 2010/0118706 | A1* | 5/2010 | Parkvall et al. ............... 370/241 |
| 2010/0118839 | A1 | 5/2010 | Malladi et al. |
| 2010/0165882 | A1 | 7/2010 | Palanki et al. |
| 2010/0167743 | A1 | 7/2010 | Palanki et al. |
| 2010/0172310 | A1 | 7/2010 | Cheng et al. |
| 2010/0172311 | A1 | 7/2010 | Agrawal et al. |
| 2010/0182903 | A1 | 7/2010 | Palanki et al. |
| 2010/0195566 | A1 | 8/2010 | Krishnamurthy et al. |
| 2010/0260154 | A1 | 10/2010 | Frank et al. |
| 2010/0272094 | A1 | 10/2010 | Byard et al. |
| 2010/0311437 | A1 | 12/2010 | Palanki et al. |
| 2010/0323718 | A1 | 12/2010 | Jen |
| 2011/0116436 | A1 | 5/2011 | Bachu et al. |
| 2011/0117925 | A1 | 5/2011 | Sampath et al. |
| 2011/0143770 | A1 | 6/2011 | Charbit et al. |
| 2011/0143773 | A1 | 6/2011 | Kangas et al. |
| 2011/0148700 | A1 | 6/2011 | Lasagabaster et al. |
| 2011/0149868 | A1 | 6/2011 | Krishnamurthy et al. |
| 2011/0149903 | A1 | 6/2011 | Krishnamurthy et al. |
| 2011/0158200 | A1 | 6/2011 | Bachu et al. |
| 2011/0190016 | A1 | 8/2011 | Hamabe et al. |
| 2011/0244884 | A1 | 10/2011 | Kangas et al. |
| 2011/0268101 | A1 | 11/2011 | Wang et al. |
| 2011/0286349 | A1 | 11/2011 | Tee et al. |
| 2012/0002609 | A1 | 1/2012 | Larsson et al. |
| 2012/0021769 | A1* | 1/2012 | Lindoff et al. ............... 455/456.1 |
| 2012/0122478 | A1 | 5/2012 | Siomina et al. |
| 2013/0150092 | A1 | 6/2013 | Frank et al. |
| 2013/0273905 | A1 | 10/2013 | Krishnamurthy et al. |

FOREIGN PATENT DOCUMENTS

| | | |
|---|---|---|
| EP | 1443791 B1 | 1/2004 |
| WO | 9921389 A1 | 4/1999 |
| WO | 2007052115 A2 | 5/2007 |
| WO | 2008033117 A1 | 3/2008 |
| WO | 2008137354 A1 | 11/2008 |
| WO | 2008137607 A2 | 11/2008 |
| WO | 2010138039 A1 | 12/2010 |

OTHER PUBLICATIONS

3GPP TS 36.355 V9.0.0, Technical Specification Group Radio Access Network, E-UTRA, "LTE Positioning Protocal (LLP) (Release 9)" Dec. 2009, 102 pages.

3GPP TS 36.213 V9.0.0, Technical Specification Group Radio Access Network, E-UTRA, "Physical layer procedures (Release 9)" Dec. 2009, 79 pages.

USPTO Notice of Allowance for U.S. Appl. No. 12/365,166, Apr. 16, 210, 11 pages.

USPTO Notice of Allowance for U.S. Appl. No. 12/365,166, Aug. 25, 2010, 9 pages.

3GPP TS 36.211 V9.0.0, Technical Specification Group Radio Access Network, E-UTRA, "Physical Channels and Modulation (Release 9)" Dec. 2009, 85 pages.

USPTO Patent Application Titled "Threshold Determination in TDOA-Based Positioning System" U.S. Appl. No. 12/712,191, filed Feb. 24, 2010.

3GPP TSG RAN WG4 #53, Nov. 9-13, 2009, Jeju, South Korea; "System simulation results for OTDOA" Ericsson, R4-094532; 3 pages.

3GPP TSG RAN WG1 #59, Nov. 9-13, 2009, Jeju, South Korea, "Introduction of LTE Positioning" Ericsson et al.; R1-094429, 5 pages.

USPTO Patent Application Titled "Restrictions on Autonomous Muting to Enable Time Difference of Arrival Measurements" U.S. Appl. No. 61/295,678, filed Jan. 15, 2010.

3GPP TSG RAN2 #70, May 10-14, 2010, Montreal, Canada "Signalling support for PRS muting in OTDOA" Ericsson, ST-Ericsson; R2-103102, 2 pages.

3GPP TSG RAN3 #68, May 10-14, 2010, Montreal, Canada "Addition of PRS Muting Configuration information to LPPa" Ericsson, R3-101526, 7 pages.

3GPP TSG RAN1 #57, Jun. 29-Jul. 3, 2009; Los Angeles, CA, USA; "On Serving Cell Muting for OTDOA Measurements" Motorola, R1-092628, 7 pages.

3GPP TSG RAN WG1 #55bis; Ljubljana, Slovenia; Jan. 12-16, 2009, "Improving the hearability of LTE Positioning Service" Alcatel-Lucent, R1-090053, 5 pages.

Patent Cooperation Treaty, "PCT Invitation to Pay Additional Fees and, where Applicable, Protest Fee" for International Application No. PCT/US2010/038257 Oct. 1, 2010, 9 pages.

3GPP TSG RAN WG4 (Radio) #20, New Jersey, USA; Nov. 12-16, 2001, "UTRAN SFN-SFN observed time difference measurement & 3GPP TS 25.311 IE 10.3.7.106 UE positioning OTDOA neighbour cell info' assistance data fields", Tdoc R4-011408, 4 pages.

USPTO Patent Application Titled "Method and Apparatus for Transmitting Positioning Reference Signals in a Wireless Communication Network" U.S. Appl. No. 12/870,148, filed Aug. 27, 2010.

3GPP TS 36.211 V8.6.0, Technical Specification Group Radio Access Network; E-UTRA; Physical Channels and Modulation: (Release 8) Mar. 2009; 83 pages.

USPTO Patent Application Titled "Muting Time Masks to Suppress Serving Cell Interference for Observed Time Difference of Arrival Location" U.S. Appl. No. 12/542,374, filed Aug. 17, 2009.

3GPP TSG RAN WG1 #58, Aug. 24-28, 2009, Shenzhen, China, "Draft CR 36.211 Introduction of LTE Positioning", R1-093603; 5 pages.

3GPP TSG RAN WG1 #59, Nov. 9-13, 2009, Jeju, South Korea, Change Request 36.211 "Introduction of LTE positioning" Ericsson, R1-095027; 6 pages.

(56) References Cited

OTHER PUBLICATIONS

3GPP TSG RAN WG1 #58, Aug. 24-28, 2009, Shenzhen, China, "Draft CR 36.213 Introduction of LTE Positioning", R1-093604; 3 pages.
3GPP TSG RAN WG1 #58, Aug. 24-28, 2009, Shenzhen, China, "Draft CR 36.214 Introduction of LTE Positioning", R1-093605; 6 pages.
3GPP TSG RAN WG1 #59, Nov. 9-13, 2009, Jeju, South Korea, "Text proposal on Orthonogonal PRS transmissions in mixed CP deployments using MBSFN subframes" Motorola, R1-095003; 4 pages.
3GPP TSG RAN WG1 #59, Nov. 9-13, 2009, Jeju, South Korea, Change Request 36.214 "Introduction of LTE positioning" Ericsson, et al., R1-094430; 4 pages.
3GPP TSG RAN WG1 #58bis, Oct. 12-16, 2009, Miyazaki, Japan, Change Request 36.213 "Clarification of PDSCH and PRS in combination for LTE positioning" Ericsson, et al., R1-094262; 4 pages.
USPto Patent Application Titled "Interference Control SINR Optimization and Signaling Enhancements to Improve the Performance of OTDOA Measurements" U.S. Appl. No. 12/813,221, filed Jun. 10, 2010.
USPTO Patent Application Titled "A Wireless Terminal and Method for Managing the Receipt of Position Reference Signals for Use in Determining a Location" U.S. Appl. No. 12/492,339, filed Jun. 26, 2009.
3GPP TSG RAN WG1 #56bis, Feb. 9-13, 2009; Athens, Greece; PHY Layer Specification Impact of Positioning Improvements Qualcomm Europe, R1-090852, 3 pages.
3GPP TSG RAN WG1 #56bis, Mar. 23-27, 2009, "Further details on DL OTDOA" Ericsson, R1-091312, 6 pages.
Patent Cooperation Treaty, "PCT Search Report and Written Opinion of the International Searching Authority" for International Application No. PCT/US2010/036982 Nov. 22, 2010, 17 pages.
3GPP TS 25.305 V8.1.0 (Dec. 2008) 3rd Generation Partnership Project; Technical Specification Group Radio Access Network; Stage 2 functional specificaiton of User Equipment (UE) positiong in UTRAN (Release 8), 80 pages.
3GPP TSG RAN WG2 #66bis, R2-093855; "Evaluation of protocol architecture alternatives for positioning" Qualcomm Europe, et al., Jun. 29-Jul. 3, 2009, Los Angeles, CA, USA; 4 pages.
3GPP TS 36.305 V0.2.0 (May 2009) 3rd Generation Partnership Project; Technical Specification Group Radio Access Network; Evolved Universal Terrestrial Radio Access (E-UTRA); Stage 2 functional specification of User Equipment (UE) positioning in E-UTRAN (Release 9); 60pages.
3GPP TSG RAN WG1 #57, R1-091911; "Discussions on UE positioning issues" Nortel, May 4-8, 2009, San Francisco, USA; 12 pages.
3GPP TS 04.35 V8.3.0 (Jan. 2001) 3rd Generation Partnership Project; Technical Specification Group GSM EDGE Radio Access network; Location Services (LCS); Broadcast network Assistance for Enhanced Observed Time Difference (E-OTD) and Global Positioning System (GPS) Positioning Methods (Release 1999), 36 pages.
Patent Cooperation Treaty, "PCT Search Report and Written Opinion of the International Searching Authority" for International Application No. PCT/US2010/041451 Oct. 25, 2010, 16 pages.
3GPP TSG RAN1 #58;Shenzhen, P.R. China; Aug. 24-28, 2009; Motorola; Positioning Subframe Muting for OTDOA Measurements; R1-093406.
3GPP TSG RAN WG1 Meeting #56bis; Seoul, South Korea, Mar. 23-27, 2009; Ericsson; Reference Signals for Low Interference Subframes in Downlink; R1-091314.
John P. Costas, Fellow, IEEE; Proceedings of the IEEE, vol. 72, No. 8; Aug. 1984; A Study of a Class of Detection Waveforms Having a Nearly Ideal Range-Doppler Ambiguity Properties; 14 pages.
Jiann-Ching Guey; Ericsson Research; North Carolina, USA; Synchronization Signal Design for OFDM Based on Time-Frequency Hopping Patterns; 6 pages.

3GPP TSG RAN WG1 Meeting #58; Shenzhen, China; Aug. 24-28, 2009; LS on Assistance Information for OTDOA Positioning Support for LTE Rel-9; R1-093729; 3 pages.
USPTO U.S. Appl. No. 12/365,166, filed Feb. 3, 2009; Krishnamurthy, et al.; Apparatus and Method for Communicating and Processing a Positioning Reference Signal Based on Identifier Associated with a Base Station.
3GPP TS 36.211 v8.4.0 (Sep. 2008); 3rd Generation Partnership Project; Technical Specification Group Radio Access Network; Evolved Universal Terrestrial Radio Access (E-UTRA); Physical Channels and Modulation (Release 8); 78 pages.
3GPP TSG-RAN WG1 #55bis; Jan. 12-19, 2009; Ljubljana, Slovenia; On OTDOA in LTE, Qualcomm Europe; R1-090353; 8 pages.
3GPP TSG RAN #42; Athens, Greece; Dec. 2-5, 2008; Positioning Support for LTE; RP-080995; 6 pages.
USPTO, U.S. Appl. No. 12/365,166; Office Action—Election/Restrictions; dated Nov. 12, 2009; 7 pages.
U.S. Appl. No. 12/365,166; Krishnamurthy, et al.; Preliminary Amendment filed Dec. 22, 2009; 12 pages.
USPTO U.S. Appl. No. 61/186,568, filed Jun. 12, 2009; Krishnamurthy et al.; Interference Control, SINR Optimization and Signaling Enhancements to Improve the Performance of OTDOA Measurements.
United States Patent and Trademark Office, "Notice of Allowance and Fee(s) Due" for U.S. Appl. No. 13/040,090 dated Mar. 8, 2012, 6 pages.
Patent Cooperation Treaty, "PCT Search Report and Written Opinion of the International Searching Authority" for International Application No. PCT/US2011/044103 Oct. 24, 2011, 15 pages.
3GPP TSG RAN WG1 #59bis, Jan. 18-22, 2009, Jeju, Valencia, Spain, Change Request "Clarification of the CP length of empty OFDM symbols in PRS subframes" Ericsson, ST-Ericsson, Motorola, Qualcomm Inc, R1-100311; 2 pages.
United States Patent and Trademark Office, "Non-Final Rejection" for U.S. Appl. No. 12/542,374 dated Dec. 23, 2011, 23 pages.
United States Patent and Trademark Office, "Non-Final Rejection" for U.S. Appl. No. 12/573,456 dated Nov. 18, 2011, 10 pages.
United States Patent and Trademark Office, "Final Rejection" for U.S. Appl. No. 12/573,456 dated Mar. 21, 2012, 14 pages.
United States Patent and Trademark Office, "Non-Final Rejection" for U.S. Appl. No. 12/542,374 dated Aug. 31, 2012, 28 pages.
United States Patent and Trademark Office, "Non-Final Office Action" for U.S. Appl. No. 12/712,191 dated Aug. 22, 2012, 19 pages.
3GPP TSG-RAN WG1 #57, R1-091912 "Simulation results on UE positioning using positioning reference signals" Nortel; San Francisco, USA, May 4-8, 2009, 11 pages.
3GPP TS 25.305 V8.1.0 (Dec. 2008) 3rd Generation Partnership Project; Technical Specification Group Radio Access Network; Stage 2 functional specificiation of User Equipment (UE) positioning in UTRAN (Release 9), 79 pages.
Patent Cooperation Treaty, "Search Report and Written Opinion" for International Application No. PCT/US2011/025607 Aug. 19, 2011, 21 pages.
United States Patent and Trademark Office, "Non-Final Rejection" for U.S. Appl. No. 12/492,339 dated Aug. 19, 2011, 14 pages.
Ericsson: "On OTDOA method for LTE Positioning", 3GPP Draft; R1-090918, 3RD Generationa Partnership Project (3GPP), Mobile Competence Centre; 650, Route Des Lucioles; F-06921 Sophia-Antipolis Cedex; France, no. Athens, Greece; Feb. 4, 2009, all pages.
Patent Cooperation Treaty, International Search Report and Written Opinion of the International Searching Authority for International Application No. PCT/US2010/030516, Oct. 8, 2010, 24 pages.
Japanese Patent Office; Office Action for Japanese Patent Application No. 2012-503786 dated Apr. 2, 2013, 6 pages.
3GPP TSG RAN1 #56bis, R1-091336 "Study on hearability of reference signals in LTE positioning support" Motorola; Seoul, South Korea; Mar. 23-29, 2009; 8 pages.

(56) References Cited

OTHER PUBLICATIONS

United States Patent and Trademark Office, "Non-Final Office Action" for U.S. Appl. No. 12/973,467 dated Mar. 28, 2013, 10 pages.
United States Patent and Trademark Office, "Non-Final Rejection" for U.S. Appl. No. 13/759,089 dated Apr. 18, 2013, 17 pages.
United States Patent and Trademark Office, "Non-Final Rejection" for U.S. Appl. No. 12/813,221 dated Oct. 8, 2013, 11 pages.
United States Patent and Trademark Office, "Non-Final Rejection" for U.S. Appl. No. 12/542,374 dated Aug. 7, 2013, 23 pages.
United States Patent and Trademark Office, "Non-Final Rejection" for U.S. Appl. No. 12/542,374 dated Feb. 24, 2014, 26 pages.

* cited by examiner

COSTAS BLOCK INTERLEAVING - 10 X 10 EXAMPLE

SUBFRAME WITH PRS AT CENTER
AND DATA ON OUTER RBs

METHOD AND APPARATUS FOR GENERATING REFERENCE SIGNALS FOR ACCURATE TIME-DIFFERENCE OF ARRIVAL ESTIMATION

CROSS REFERENCE TO RELATED APPLICATIONS

The present application is a non-provisional application of co-pending U.S. Application No. 61/168,189 filed on 9 Apr. 2009, the contents of which are hereby incorporated by reference and from which benefits are claimed under 35 U.S.C. 119.

FIELD OF THE DISCLOSURE

The present disclosure relates generally to wireless communication networks and, more particularly, to an apparatus and method for communicating and processing positioning reference signals in a downlink subframe based on an identifier associated with a base station transmitting the subframe.

BACKGROUND

Wireless communication networks are well known. Some networks are completely proprietary, while others are subject to one or more standards to allow various vendors to manufacture equipment for a common system. One such standards-based network is the Universal Mobile Telecommunications System (UMTS). UMTS is standardized by the Third Generation Partnership Project (3GPP), a collaboration between groups of telecommunications associations to make a globally applicable third generation (3G) mobile phone system specification within the scope of the International Mobile Telecommunications-2000 project of the International Telecommunication Union (ITU). Efforts are currently underway to develop an evolved UMTS standard, which is typically referred to as UMTS Long Term Evolution (LTE) or Evolved UMTS Terrestrial Radio Access (E-UTRA).

According to Release 8 of the E-UTRA or LTE standard or specification, downlink communications from a base station (referred to as an "enhanced Node-B" or simply "eNB") to a wireless communication device (referred to as "user equipment" or "UE") utilize orthogonal frequency division multiplexing (OFDM). In OFDM, orthogonal subcarriers are modulated with a digital stream, which may include data, control information, or other information, so as to form a set of OFDM symbols. The subcarriers may be contiguous or discontiguous and the downlink data modulation may be performed using quadrature phase shift-keying (QPSK), 16-ary quadrature amplitude modulation (16QAM), or 64QAM. The OFDM symbols are configured into a downlink subframe for transmission from the base station. Each OFDM symbol has a time duration and is associated with a cyclic prefix (CP). A cyclic prefix is essentially a guard period between successive OFDM symbols in a subframe. According to the E-UTRA specification, a normal cyclic prefix is about five (5) microseconds and an extended cyclic prefix is 16.67 microseconds.

In contrast to the downlink, uplink communications from the UE to the eNB utilize single-carrier frequency division multiple access (SC-FDMA) according to the E-UTRA standard. In SC-FDMA, block transmission of QAM data symbols is performed by first discrete Fourier transform (DFT)-spreading (or precoding) followed by subcarrier mapping to a conventional OFDM modulator. The use of DFT precoding allows a moderate cubic metric/peak-to-average power ratio (PAPR) leading to reduced cost, size and power consumption of the UE power amplifier. In accordance with SC-FDMA, each subcarrier used for uplink transmission includes information for all the transmitted modulated signals, with the input data stream being spread over them. The data transmission in the uplink is controlled by the eNB, involving transmission of scheduling requests (and scheduling information) sent via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher-order modulation and adaptive modulation and coding (AMC), large spectral efficiency is possible by scheduling users with favorable channel conditions.

E-UTRA systems also facilitate the use of multiple input and multiple output (MIMO) antenna systems on the downlink to increase capacity. As is known, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include such spatial parameters as rank indicator, or the number of data streams sent on the same resources; precoding matrix index (PMI); and coding parameters, such as a modulation and coding scheme (MCS) or a channel quality indicator (CQI). For example, if a UE determines that the link can support a rank greater than one, it may report multiple CQI values (e.g., two CQI values when rank=2). Further, the link quality measurements may be reported on a periodic or aperiodic basis, as instructed by an eNB, in one of the supported feedback modes. The reports may include wideband or sub-band frequency selective information of the parameters. The eNB may use the rank information, the CQI, and other parameters, such as uplink quality information, to serve the UE on the uplink and downlink channels.

As is also known, present-day cellular telephones include global positioning system (GPS) receivers to assist in locating the devices and their owners in the event of an emergency and to comply with E-911 mandates from the Federal Communication Commission (FCC). Under most circumstances, the phone's GPS receiver can receive signals from the appropriate quantity of GPS satellites and convey that information to the cellular system's infrastructure for determination of the device's location by, for example, a location server coupled to or forming part of the wireless network. However, there are some circumstances under which the GPS receiver is ineffective. For example, when a user and his or her cell phone are located within a building, the GPS receiver may not be able to receive signals from an appropriate quantity of GPS satellites to enable the location server to determine the device's position. Additionally, wireless devices in private systems are not required to meet the FCC E-911 mandates and may not include a GPS receiver. However, circumstances may arise under which determining locations of wireless devices operating in such systems may be necessary.

To compensate for the intermittent ineffectiveness of the GPS system and to provide location-determining capabilities in private systems, many wireless systems utilize signaling and include processes through which a wireless device's location can be estimated. For example, in many systems, base stations regularly transmit positioning reference signals that are received by the wireless devices and used either to determine information based upon which an infrastructure device, such as a location server, can compute (e.g., via triangulation and/or trilateration) the wireless device's location or to determine the location of the wireless device autonomously (i.e., at the wireless device itself). When a location server is intended to compute the wireless device's location, the wireless device may determine time of arrival (TOA) or time difference of arrival (TDOA) information upon receiving the positioning reference signal and communicate the TOA or TDOA to the location server via a serving base station (i.e., a base station providing wireless communication service to the wireless device). The TOA or TDOA information is typically determined based on an internal clock of the wireless device as established by the wireless device's local oscillator in accordance with known techniques.

Contribution R1-090353 to the 3GPP Radio Access Network (RAN) Working Group 1 (3GPP RAN1) provides one approach for developing downlink subframes for use in conveying positioning reference signals to UEs in E-UTRA systems. According to Contribution R1-090353, QPSK symbols containing the positioning reference signal are distributed throughout OFDM symbols that are not allocated to control information such that two resource elements per resource block per OFDM symbol carry the positioning reference symbols. FIG. 1 illustrates exemplary downlink subframes 101, 103 transmitted by eNBs serving cells neighboring the cell in which the UE is currently operating. As illustrated, each subframe 101, 103 includes a resource block of twelve subcarriers ($sub_0$ through $sub_{11}$), each of which is divided into twelve time segments ($t_0$ through $t_{11}$). Each time segment on a particular subcarrier is a resource element 102, 104, which contains a digitally modulated (e.g., QPSK, 16QAM or 64 QAM) symbol. A set of resource elements 102, 104 spread across all the subcarriers during a particular segment or duration of time forms an OFDM symbol. A set of OFDM symbols (twelve as illustrated in FIG. 1) forms each subframe 101, 103.

In the illustrated subframes 101, 103, the first two OFDM symbols of each subframe 101, 103 include cell-specific reference symbols (denoted "CRS" in the subframes 101, 103) and other control information (denoted as "C" in the subframes 101, 103) and the remaining OFDM symbols contain the positioning reference signal encoded as symbols into two resource elements 102 of each OFDM symbol. The resource elements 102, 104 containing the positioning reference signal are denoted "PRS" in the subframes 101, 103. The eNBs transmitting the subframes 101, 103 are controlled by one or more controllers in an attempt to maintain orthogonality of the arrangement of the positioning reference signals within the non-control portions of the subframes 101, 103 by insuring that the positioning reference signal symbols are multiplexed into non-overlapping resource elements 102, 104. Notwithstanding such intent to maintain orthogonality in this manner, the proposed subframe structure may cause a loss of orthogonality under certain conditions. For example, when using a normal cyclic prefix (CP) for each OFDM symbol in the exemplary subframes 101, 103, an inter-site distance (ISD) of 1.5 kilometers and a channel delay spread of five microseconds can result in a loss of orthogonality between the different eNB transmitters even when they transmit on non-overlapping resource elements 102, 104 as illustrated in FIG. 1. The loss of orthogonality results because the overall delay spread of the downlink channel (i.e., propagation delay plus multipath delay spread) as seen from the UE exceeds the CP length for normal CP (approximately five microseconds) and, therefore, DFT precoding is non-orthogonal. For the case of an extended CP (approximately 16.67 microseconds) deployment, an ISD of 4.5 km and a channel delay spread of five microseconds can result in loss of orthogonality of subcarrier transmissions.

The various aspects, features and advantages of the disclosure will become more fully apparent to those having ordinary skill in the art upon careful consideration of the following Detailed Description thereof with the accompanying drawings described below.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the one or more embodiments of the disclosure.

Figure 1:
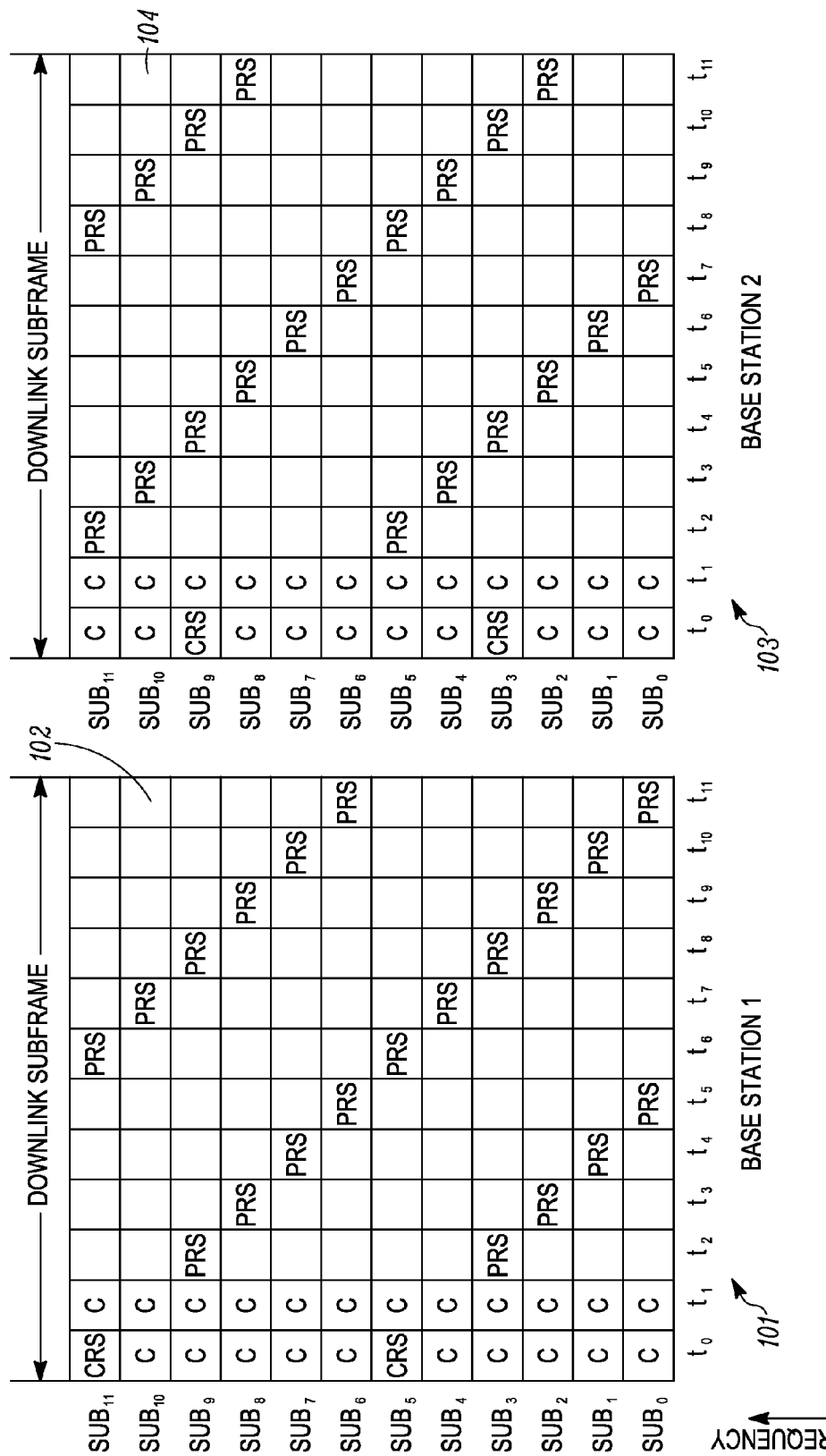
FIG. 1 is an exemplary downlink subframe for transmitting a positioning reference signal from a base station to a wireless communication device in accordance with the E-UTRA standard.

Skilled artisans will appreciate that elements in the figures are illustrated for simplicity and clarity and have not necessarily been drawn to scale or to include every component of an element. For example, the dimensions of some of the elements in the figures may be exaggerated alone or relative to other elements, or some and possibly many components of an element may be excluded from the element, to help improve the understanding of the various embodiments of the present invention.

DETAILED DESCRIPTION

Generally, the present invention encompasses an apparatus and method for communicating positioning reference signals based on an identifier associated with a base station. In accordance with one embodiment, the apparatus is a wireless communication device that includes, inter alia, a receiver and a processor. The receiver is operable to receive at least a section of one or more subframes, which may or may not be time contemporaneous, from one or more base stations (e.g., providing wireless communication service to service coverage areas (e.g., cells) adjacent to a service coverage area in which the wireless communication device is located). Each subframe includes transmission resources (e.g., E-UTRA resource elements) that are divided in time over a symbol across a plurality of subcarriers to form a plurality of orthogonal frequency division multiplexed (OFDM) symbols. Each transmission resource is transmitted for a predetermined amount of time on a respective one of the subcarriers within an OFDM symbol. The OFDM symbols are arranged into at least a first set of OFDM symbols that includes a positioning reference signal (e.g., an observed time difference of arrival (OTDOA) waveform) and a second set of OFDM symbols that does not include a positioning reference signal, but which may optionally include a cell-specific reference signal, and control information (e.g., a Physical Downlink Control Channel or PDCCH).

In one embodiment, the processor is operable to determine a time of arrival (TOA) of the positioning reference signal based on reference timing information (e.g., produced from the wireless device's local oscillator) corresponding to a transmission from a particular base station. Further, the processor may be operable to determine a time of arrival of the positioning reference signal transmitted from a second base station based on reference timing information and to compute a time difference of arrival (TDOA) of the positioning reference signal from the second base station relative to the first base station. In such an embodiment, the wireless communication device may further include a transmitter that is operable to communicate at least one of the time of arrival and the time difference of arrival to a location server via a base station that is providing wireless communication service to the wireless communication device.

In an alternative embodiment, the apparatus may be a base station operable to encode, multiplex, and transmit a downlink subframe containing a positioning reference signal, a cell-specific reference signal, and optionally other information, such as control information. In such an embodiment, the base station includes, inter alia, a processor and a transmitter.

The base station processor is operable to encode a positioning reference signal into a first set of transmission resources (e.g., E-UTRA resource elements), encode information other than the positioning reference signal into a second set of transmission resources, and multiplex the first set of transmission resources and the second set of transmission resources into a subframe that includes a plurality of OFDM symbols. The base station transmitter is operable to transmit to the subframe to wireless communication devices within a coverage range of the base station.

According to one embodiment, the first set of transmission resources is multiplexed into a portion (i.e., some, but not all, OFDM symbols) of a first set of OFDM symbols of the subframe (e.g., OFDM symbols forming a portion of the subframe that is not used for transmitting control information (e.g., not forming a PDCCH region)) based on an identifier associated with the base station and the second set of transmission resources is multiplexed into a second set of OFDM symbols of the subframe (e.g., OFDM symbols used for transmitting control information (e.g., a PDCCH)). Further, the first set of transmission resources may be multiplexed into the first set of OFDM symbols such that the transmission resources are multiplexed onto a subset of the subcarriers forming one or more OFDM symbols of the first set of OFDM symbols. For example, the first set of transmission resources may be multiplexed onto one-sixth of the subcarriers forming an OFDM symbol (e.g., every sixth subcarrier may be used for carrying a transmission resource corresponding to the positioning reference signal).

Figure 2:
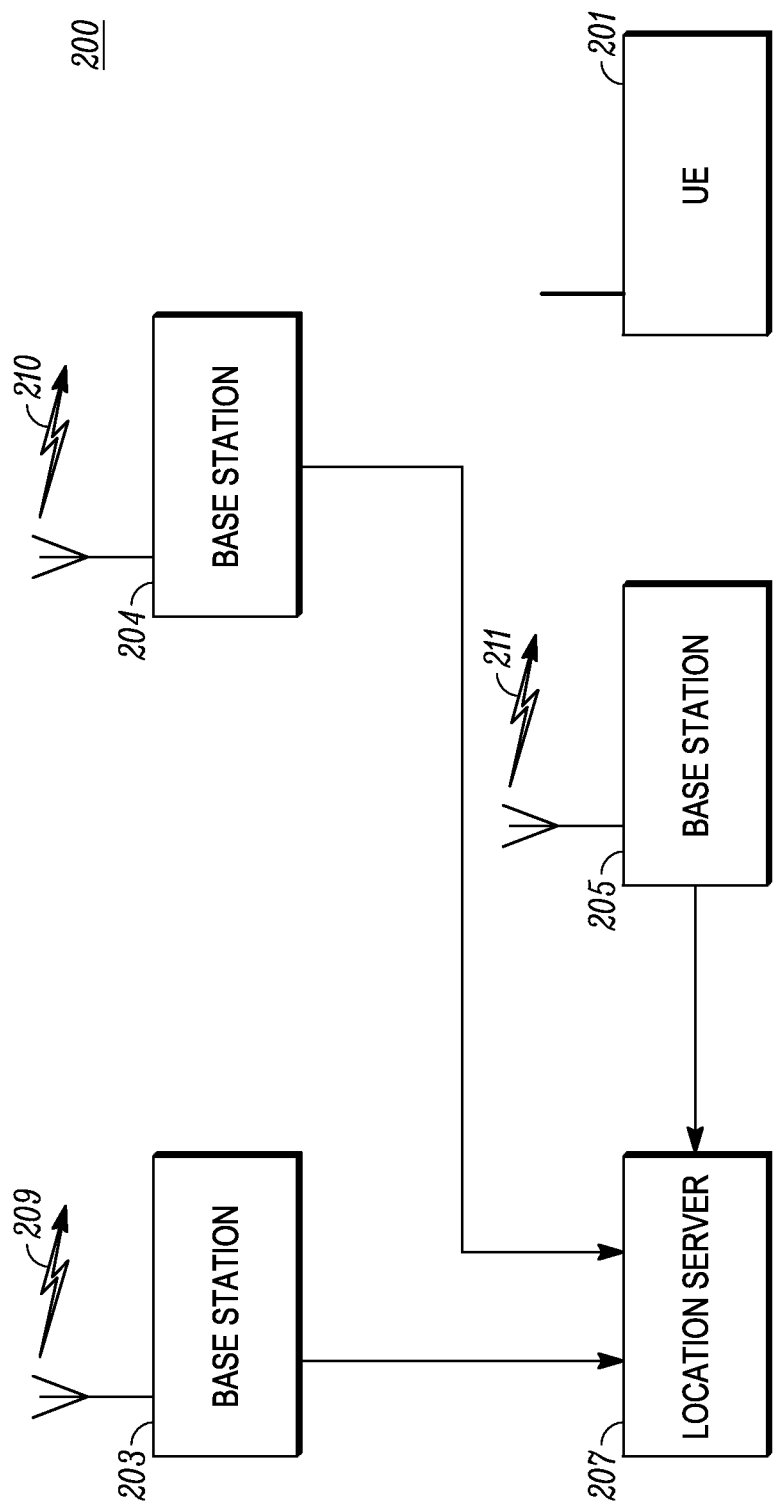
FIG. 2 is an electrical block diagram of a wireless communication system providing wireless communication service to a wireless communication device in accordance with an exemplary embodiment of the present invention.

Embodiments of the present invention can be more readily understood with reference to FIG. 25, in which like reference numerals designate like items. FIG. 2 is an electrical block diagram of a wireless communication system 200 providing wireless communication service to one or more wireless communication devices 201 in accordance with an exemplary embodiment of the present invention. The wireless system 200 includes, inter alia, a plurality of base stations 203-205 (three shown for illustrative purposes), one or more wireless communication devices 201 (one shown for illustrative purposes), and an optional location server 207. Typically, the wireless system would include many other base stations and wireless communication devices. However, for purposes of simplicity in connection with describing the various features of the present invention, FIG. 2 depicts only one three base stations 203-205 and one wireless communication device 201. In one embodiment, the wireless communication system 200 is a system that implements the E-UTRA standard. Alternatively, the wireless system 200 may be any system that utilizes orthogonal frequency division multiplexing and enables wireless devices 201 to autonomously determine their location or position within the system 200 or absolutely, or assist with such location determination by, for example, reporting timing information (e.g., time of arrival (TOA) or time difference of arrival (TDOA) information) to the location server 207.

The wireless communication device 201 may be implemented as a mobile telephone, a smart phone, a text messaging device, a handheld computer, a wireless communication card, a personal digital assistant (PDA), a notebook or laptop computer, a consumer premises equipment (CPE), or any other communication device that has been modified or fabricated to include the functionality of the present invention. A smart phone is a mobile telephone that has additional application processing capabilities. For example, in one embodiment, a smart phone is a combination of (i) a pocket personal computer (PC), handheld PC, palm top PC, or PDA, and (ii) a mobile telephone. Exemplary smart phones are the iPHONE™ available from Apple, Inc. of Cupertino, Calif. and the MOTOROLA Q™ available from Motorola, Inc. of Schaumburg, Ill. A wireless communication card, in one embodiment, resides or is insertable within a PC or a laptop computer. The term "wireless communication device," as used herein and the appended claims, is intended to broadly cover many different types of devices that can receive and/or transmit signals and that can operate in a wireless communication system. For example, and not by way of limitation, a wireless communication device can include any one or a combination of the following: a cellular telephone, a mobile phone, a smart phone, a two-way radio, a two-way pager, a wireless messaging device, a laptop/computer, an automotive gateway, a residential gateway, a personal computer, a server, a PDA, CPE, a router, a cordless telephone, a wireless email device, a portable gaming device including a built-in wireless modem, and the like. An electrical block diagram of an exemplary wireless communication device 201 is illustrated in FIG. 3.

The base stations 203-205 provide wireless communication service within respective geographic service coverage areas (e.g., cells). The base stations 203-205 may be co-located or diversely located. When co-located, the base stations 203-205 may provide wireless service to respective portions (e.g., sectors) of a single service coverage area (e.g., a cell). In one embodiment, the base stations are eNBs that operate in accordance with the E-UTRA standard.

The location server 207 is well known and is used to determine locations of wireless communication devices 207 within the wireless communication system 200. In one embodiment, the location server 207 uses triangulation or trilateration to locate a wireless communication device 201 based on known locations of base stations 203-205 within the system 200 together with time of arrival or time difference of arrival measurements made and reported by the wireless communication device 201 in response to receiving subframes carrying positioning reference signals 209-211 from the base stations 203-205. Locations determined by the location server 207 may be used for a variety of reasons, including to locate a wireless device that has made an emergency call when such device does not include GPS functionality or when GPS functionality is inoperable or impaired for any reason. While the location server 207 is shown a distinct entity from the base stations 203-205, it is not necessary as certain base stations can also provide the logical functionality of a location server 207.

Figure 3:
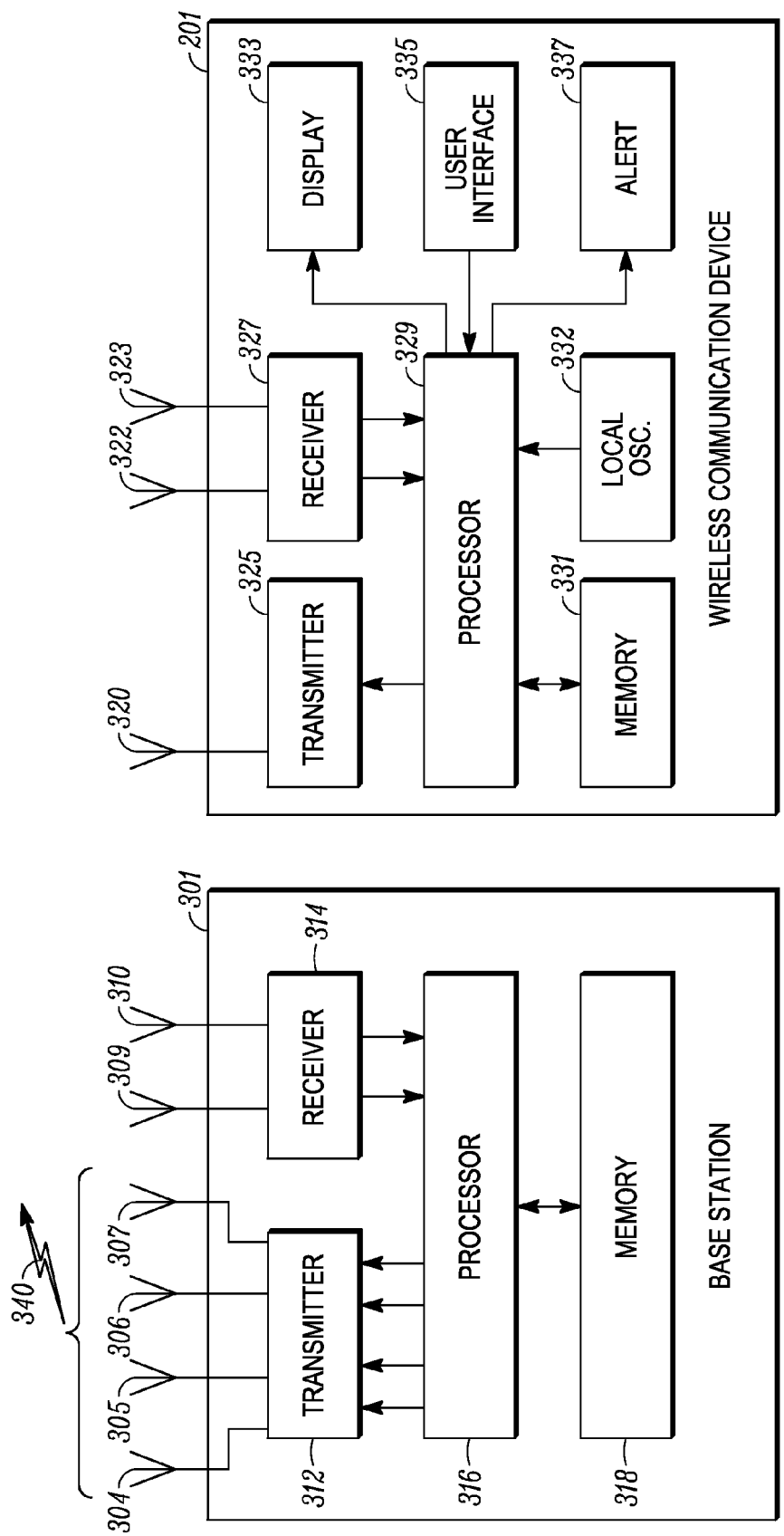
FIG. 3 illustrates electrical block diagrams of an exemplary base station usable in the wireless communication system of FIG. 2 and a wireless communication device, in accordance with an exemplary embodiment of the present invention.
Figure 4:
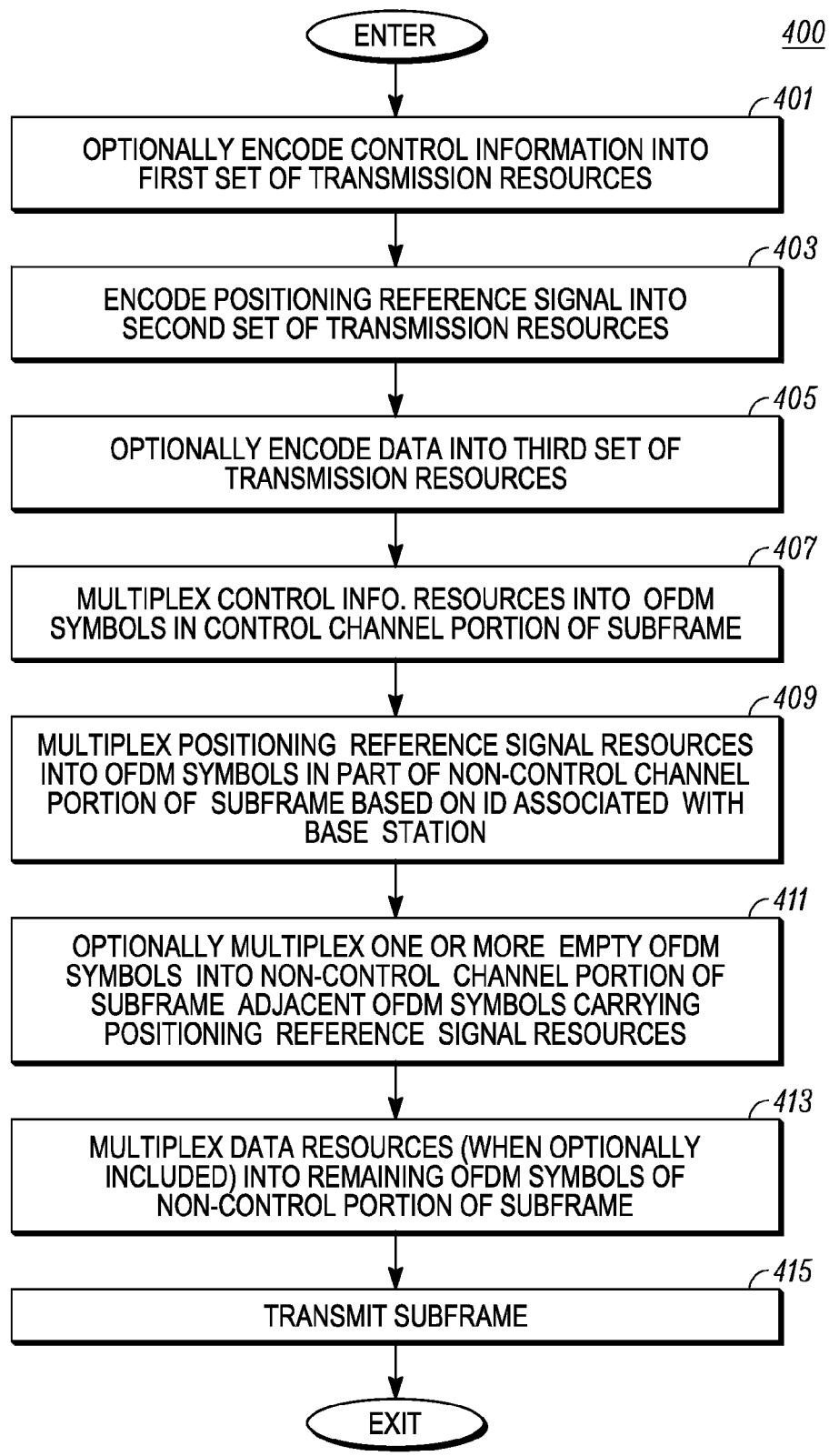
FIG. 4 is a logic flow diagram of steps executed by a base station to generate a downlink subframe for transmission of a positioning reference signal to a wireless communication device, in accordance with an exemplary embodiment of the present invention.

FIG. 3 illustrates electrical block diagrams of the wireless communication device 201 and an exemplary base station 301 usable in the wireless communication system 200 of FIG. 2. The base station 301 may be used to implement any of the base stations 203-205 of the wireless communication system 200 of FIG. 2. Each base station 301 includes, inter alia, one or more transmit antennas 304-307 (four shown for illustrative purposes), one or more receive antennas 309, 310 (two shown for illustrative purposes), one or more transmitters 312 (one shown for illustrative purposes), one or more receivers 314 (one shown for illustrative purposes), one or more processors 316 (one shown for illustrative purposes), and memory 318. Although illustrated separately, the transmitter 312 and the receiver 314 may be integrated into one or more transceivers as is well understood in the art. By including multiple transmit antennas 304-307 and other appropriate hardware and software as would be understood by those of ordinary skill in the art, the base station 301 may support use of a multiple input and multiple output (MIMO) antenna system for downlink (base station-to-wireless communication device) communications. The MIMO system facilitates simultaneous transmission of downlink data streams from multiple transmit antennas 304-307 depending upon a channel rank, for example as indicated by the wireless communication device 201 or as preferred by the base station 301. A rank supplied by the wireless communication device 201 assists or enables the base station 301 to determine an appropriate multiple antenna configuration (e.g., transmit diversity, open loop spatial multiplexing, closed loop spatial multiplexing, etc.) for a downlink transmission in view of the current downlink channel conditions.

The processor 316, which is operably coupled to the transmitter 312, the receiver 314, and the memory 318, can be one or more of a microprocessor, a microcontroller, a digital signal processor (DSP), a state machine, logic circuitry, any combination thereof, or any other device or combination of devices that processes information based on operational or programming instructions stored in the memory 318. One of ordinary skill in the art will appreciate that the processor 316 can be implemented using multiple processing devices as may be required to handle the processing requirements of the present invention and the various other functions of the base station 301. One of ordinary skill in the art will further recognize that when the processor 316 has one or more of its functions performed by a state machine or logic circuitry, the memory containing the corresponding operational instructions can be embedded within the state machine or logic circuitry as opposed to being external to the processor 316.

The memory 318, which may be a separate element as depicted in FIG. 3 or may be integrated into the processor 316, can include random access memory (RAM), read-only memory (ROM), FLASH memory, electrically erasable programmable read-only memory (EEPROM), removable memory, a hard disk, and/or various other forms of memory as are well known in the art. The memory 318 can include various components, such as, for example, one or more program memory components for storing programming instructions executable by the processor 316, one or more address memory components for storing an identifier associated with the base station 301 as well as for storing addresses for wireless communication devices currently in communication with the base station 301, and various data storage components. The identifier may be derived from at least one of an offset identifier specific to the base station, a base station identifier, a cell site identifier, a physical cell identifier, a global cell identifier, a slot index, a subframe index, a system frame number, and/or a radio network transaction identifier. The program memory component of the memory 318 may include a protocol stack for controlling the transfer of information generated by the processor 316 over the data and/or control channels of the system 200. It will be appreciated by one of ordinary skill in the art that the various memory components can each be a group of separately located memory areas in the overall or aggregate memory 318 and that the memory 318 may include one or more individual memory elements.

In one embodiment, the base station transmitter 312, receiver 314, and processor 316 are designed to implement and support a wideband wireless protocol, such as the Universal Mobile Telecommunications System (UMTS) protocol, the E-UTRA protocol, the 3GPP Long Term Evolution (LTE) protocol, or a proprietary protocol, operating to communicate digital information, such as user data (which may include voice, text, video, and/or graphical data) and/or control information, between the base station 301 and the wireless communication device 201 over various types of channels. In an E-UTRA system, an uplink data channel may be a PUSCH, an uplink control channel may be a physical uplink control channel (PUCCH), a downlink control channel may be a physical downlink control channel (PDCCH), and downlink data channel may be a physical downlink shared channel (PDSCH). Uplink control information may be communicated over the PUCCH and/or the PUSCH and downlink control information is communicated typically over the PDCCH.

When the base station 301 implements the E-UTRA standard, the base station processor 316, in one embodiment, includes a logical channel coding and multiplexing section for implementing channel coding and multiplexing of control information and positioning reference signals destined for transmission over a downlink subframe 340. The channel coding and multiplexing section is a logical section of the base station processor 316, which performs the coding and multiplexing responsive to programming instructions stored in memory 318. The channel coding and multiplexing section may include one channel coding block for encoding control channel information (e.g., channel quality indicators, cell-specific reference symbols (CRS), rank indicators, and hybrid automatic repeat request acknowledgments (HARQ-ACK/NACK) into associated transmission resources (e.g., time-frequency resource elements) and another block for encoding positioning reference signals and other information typically communicated over the primary/secondary synchronization channel (e.g., P/S-SCH) into associated transmission resources. The channel coding and multiplexing section of the processor 316 may include additional coding blocks for encoding various other types of information and/or reference symbols used by the wireless communication device 201 for demodulation and downlink channel quality determination. The channel coding and multiplexing section of the processor 316 also includes a channel multiplexing block that multiplexes the encoded information generated by the various channel coding blocks into a subframe, which is supplied to the transmitter 312 for downlink transmission.

Each wireless communication device 201 includes, inter alia, one or more transmit antennas 320 (one shown for illustrative purposes), one or more receive antennas 322, 323 (two shown for illustrative purposes), one or more transmitters 325 (one shown for illustrative purposes), one or more receivers 327 (one shown for illustrative purposes), a processor 329, memory 331, a local oscillator 332, an optional display 333, an optional user interface 335, and an optional alerting mechanism 337. Although illustrated separately, the transmitter 325 and the receiver 327 may be integrated into one or more transceivers as is well understood in the art. By including multiple receive antennas 322, 323 and other appropriate hardware and software as would be understood by those of ordinary skill in the art, the wireless communication device 201 may facilitate use of a MIMO antenna system for downlink communications.

The wireless communication device transmitter 325, receiver 327, and processor 329 are designed to implement and support a wideband wireless protocol, such as the UMTS protocol, the E-UTRA protocol, the 3GPP LTE protocol or a proprietary protocol, operating to communicate digital information, such as user data (which may include voice, text, video, and/or graphical data) and/or control information, between the wireless communication device 201 and a serving base station 301 over control and data channels. In an E-UTRA system, an uplink data channel may be a PUSCH and an uplink control channel may be a PUCCH. Control information may be communicated over the PUSCH and/or the PUCCH. Data is generally communicated over the PUSCH.

The processor 329 is operably coupled to the transmitter 325, the receiver 327, the memory 331, the local oscillator 332, the optional display 333, the optional user interface 335, and the optional alerting mechanism 337. The processor 329 utilizes conventional signal-processing techniques for processing communication signals received by the receiver 327 and for processing data and control information for transmission via the transmitter 325. The processor 329 receives its local timing and clock from the local oscillator 332, which may be a phase locked loop oscillator, frequency synthesizer, a delay locked loop, or other high precision oscillator. The processor 329 can be one or more of a microprocessor, a microcontroller, a DSP, a state machine, logic circuitry, or any other device or combination of devices that processes information based on operational or programming instructions stored in the memory 331. One of ordinary skill in the art will appreciate that the processor 329 can be implemented using multiple processors as may be required to handle the processing requirements of the present invention and the various other included functions of the wireless communication device 201. One of ordinary skill in the art will further recognize that when the processor 329 has one or more of its functions performed by a state machine or logic circuitry, the memory containing the corresponding operational instructions can be embedded within the state machine or logic circuitry as opposed to being external to the processor 329.

The memory 331, which may be a separate element as depicted in FIG. 3 or may be integrated into the processor 329, can include RAM, ROM, FLASH memory, EEPROM, removable memory (e.g., a subscriber identity module (SIM) card or any other form of removable memory), and/or various other forms of memory as are well known in the art. The memory 331 can include various components, such as, for example, one or more program memory components for storing programming instructions executable by the processor 329 and one or more address memory components for storing addresses and/or other identifiers associated with the wireless communication device 201 and/or the base stations 203-205. The program memory component of the memory 331 may include a protocol stack for controlling the transfer of information generated by the processor 329 over the data and/or control channels of the system 200, as well as for controlling the receipt of data, control, and other information transmitted by the base stations 203-205. It will be appreciated by one of ordinary skill in the art that the various memory components can each be a group of separately located memory areas in the overall or aggregate memory 331 and that the memory 331 may include one or more individual memory elements.

The display 333, the user interface 335, and the alerting mechanism 337 are all well-known elements of wireless communication devices. For example, the display 333 may be a liquid crystal display (LCD) or a light emitting diode (LED) display and associated driver circuitry, or utilize any other known or future-developed display technology. The user interface 335 may be a key pad, a keyboard, a touch pad, a touch screen, or any combination thereof, or may be voice-activated or utilize any other known or future-developed user interface technology. The alerting mechanism 337 may include an audio speaker or transducer, a tactile alert, and/or one or more LEDs or other visual alerting components, and associated driver circuitry, to alert a user of the wireless communication device 302. The display 333, the user interface 335, and the alerting mechanism 337 operate under the control of the processor 329.

Referring now to FIGS. 2-13, operation of a base station 301 (which may be any of the base stations 203-205 in the exemplary wireless system 200) occurs substantially as follows in accordance with the present invention. At a predetermined time (e.g., periodically or aperiodically), the base station processor 316 optionally encodes (401) control information into a first set of transmission resources of a reference block of transmission resources allocated for transmission. Where the base station 301 implements the E-UTRA or LTE standard, the allocated block of transmission resources include time-frequency resource elements to be multiplexed into a subframe of OFDM symbols forming one or more transmission channels. For each transmit antenna, the set of transmission resources form a two-dimensional resource element grid in time and frequency. In frequency, the transmission resources are typically mapped into different subcarriers within each OFDM symbol across the transmission bandwidth. Multiple such OFDM symbols comprise a subframe. In the E-UTRA standard, at least two subframe structures—one with 14 OFDM symbols referred to as a "normal CP subframe" and one with 12 OFDM symbols referred to an "extended CP subframe"—are defined. The subframe may be further divided into two halves or slots with an equal number of OFDM symbols. A subframe may carry one or more transmission channels such as control channel (e.g., PDCCH, PCFICH, PHICH), data channel (e.g., PDCCH), broadcast channel (e.g., PBCH), synchronization channel (e.g., P/S-SCH), or any other channel. In addition to these channels, the subframe may include a cell-specific reference signal, a dedicated or UE-specific reference signal, a positioning reference signal, or any other reference signal.

In E-UTRA, there are two types of subframes and one of these is the unicast subframe where the Cell-specific Reference symbols are sent in both the slots of the subframe. Some other subframes may be occasionally characterized as special sub-frames or non-unicast subframes. An example of such subframes are Multimedia Broadcast Multicast Service over a Single Frequency Network (MBSFN) subframe, wherein the subframe structure is different from a unicast subframes. In the special subframes or non-unicast subframes, the first one or two (or possibly zero) OFDM symbols may contain the PDCCH and reference symbols, whereas the rest of the subframe including the RS structure may be different than a unicast subframe. For instance, the multimedia multicast broadcast over single frequency network (MBSFN) subframe is a type of non-unicast subframe wherein the rest of the subframe may be blanked or empty and these empty resources can be used to transmit positioning reference symbols. The non-unicast (or special subframe) signaling pattern may be part of system configuration or System Information Broadcast (SIB) message and may be defined on a Radio-frame level (10 subframes) or for a group of Radio Frame level. In one embodiment, the base station processor 316 encodes control information into resource elements to be multiplexed into a portion of the first two OFDM symbols of the subframe.

The coded control information may include downlink assignments or uplink grants, control channel duration, and hybrid automatic repeat request acknowledgments (HARQ-ACK/NACK). In addition to the control information, a set of symbols corresponding to a cell-specific reference signal may be included in the subframe. The cell-specific reference signal may be used for channel estimation, demodulation, delay tracking, mobility-related measurements, and other purposes by the wireless device 201. When included, the sequence of symbols corresponding to the cell specific reference signal and the time-frequency locations occupied by the symbols may be derived from an identifier associated with the base station 301. Such identifier may include a physical cell identifier (PCID), a slot index and/or a symbol index, all of which are well known in the art particularly in connection with the E-UTRA standard. In addition, the subcarrier offset used for mapping the symbols of the cell-specific reference signal into an OFDM symbol may be derived from the physical cell identifier.

In addition to optionally encoding control information and the cell-specific reference signal into transmission resources, the base station processor 316 encodes (403) a positioning reference signal into a second set of transmission resources. The base station processor 316 encodes the positioning reference signal into a portion of a plurality of resource blocks where each resource block comprises a two-dimensional grid of approximately 12 contiguous subcarriers in frequency and all the OFDM symbols of the subframe in time where each OFDM symbol is associated with a normal or an extended cyclic prefix as described in the E-UTRA standard. For illustration purposes, a typical resource block is defined as the resources available in 12 subcarriers and all OFDM symbols of the subframe. It is noted that the resource block dimensions may be varying as some of the subcarriers of OFDM symbols may be used for other purposes such as transmission of pre-determined control primary broadcast channel, or synchronization channels, etc. The number of resource blocks available for transmission on the downlink (i.e., the link between the base station 301 and wireless device 201) may be dependent on the transmission bandwidth. The base station processor 316 may be programmed to encode the positioning reference signal into a subset of the available OFDM symbols in the subframe. In one exemplary embodiment, the base station processor 316 encodes the positioning reference signal into a portion of 600 resource elements of an OFDM symbol of the subframe when the downlink transmission bandwidth is 10 MHz. Further, not all of the subcarriers on these OFDM symbols may be used for carrying the transmission resources corresponding to the positioning reference signal. In one example, every sixth subcarrier is used for transmitting the symbols of the positioning reference signal. After the entire block of transmission resources have been multiplexed into the subframe, the base station transmitter transmits (415) the subframe via one or more of the antennas 304-307.

Figure 5:
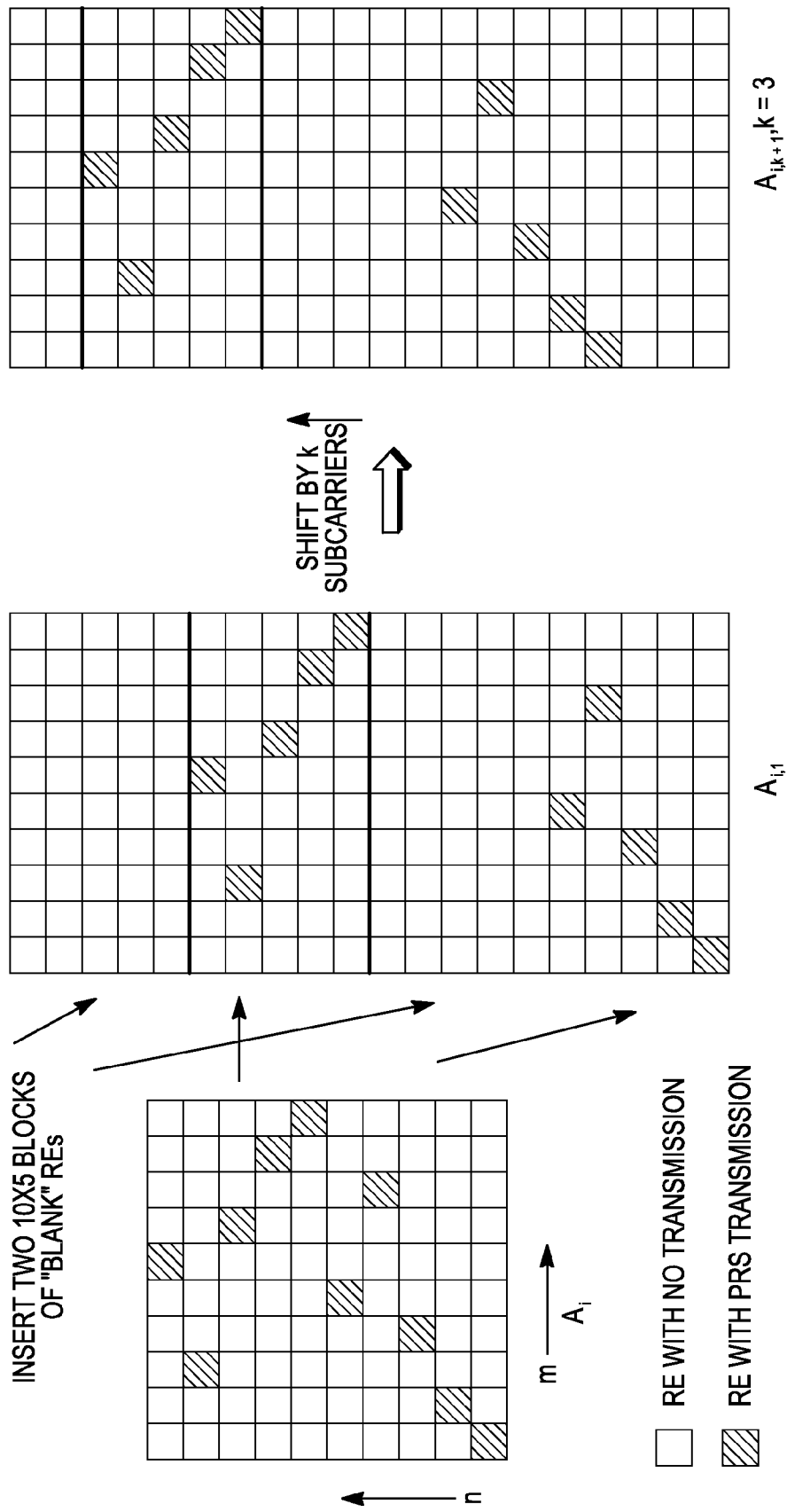
FIG. 5 is a block diagram of a method for defining multiple resource element allocations for positioning reference symbols from a single Costas array.

Referring first to FIG. 5, such figure depicts subframes 501, 502 generated and transmitted by base stations providing communication service to service coverage areas (e.g., cells or cell sectors) adjacent to or neighboring the service coverage area in which the wireless communication device 201 receiving the subframes is located. For example, in the wireless system 200 illustrated in FIG. 2, if base station 204 is supplying communication service to the wireless device 201 (i.e., the wireless device 201 is located in the service coverage area of base station 204 and, therefore, base station 204 is the serving station for the wireless device 201), then the service coverage areas serviced by base stations 203 and 205 may be considered neighboring service coverage areas and base stations 203 and 205 may be considered neighboring base stations. One of ordinary skill in the art will readily appreciate and recognize that the quantity of neighboring service coverage areas and base stations may exceed to the two illustrated in FIG. 2. Accordingly, the approach disclosed herein for subframe creation may be used by every base station in the applicable wireless system because, at some point in time, each base station serves a service coverage area neighboring a service coverage area in which at least one wireless communication device is located.

When a positioning reference signal is to be included, the resource elements for carrying the positioning reference signal may be allocated in either a pre-determined fashion (e.g., as defined in the E-UTRA or LTE standards), semi-statically through broadcast (e.g. via signaling in a master information block (MIB) or system information block (SIB)) or in a user-specific message (e.g., radio resource control measurement configuration message), dynamically (e.g., via control channel signaling in PDCCH), or by higher layer signaling (e.g., location server protocol data units. In one embodiment, the mapping of which OFDM symbol of the subframe 501, 502 contains the positioning reference signal is based on an identifier associated with the base station 203, 205, which may take into account the base station's location in the system 200 and the reuse pattern of the various subcarriers used to generate OFDM symbols of the subframe. The identifier may be one or more of an offset identifier, a base station identifier, a cell site identifier, a physical cell identifier (PCID), a global cell identifier (GCID), a symbol index, a slot index, a subframe index, a system frame number (SFN), and/or a radio network transaction identifier (RNTI).

In a planned deployment, it would be desirable to allocate eNBs in the same vicinity sets of resource elements for positioning reference symbols which are disjoint in the sense that no resource element of the set allocated to a first eNB for transmission of positioning reference symbols belongs to any of the sets of resource elements allocated to its neighboring eNBs. Two sets of resource elements which are disjoint can also be referred to as orthogonal. In some instances, it is not possible to define a number of disjoints sets of resource elements that equals or exceeds the number of eNBs in a particular region. In some instances, a region can be defined as the set of eNBs "hearable" by a UE. In these instances, it is then desirable to define sets of resource elements for positioning reference symbols which have minimum overlap and which are sufficient in number to equal or exceed the number of eNBs in a particular region. It should be noted that in this context, the degree of overlap between two sets of resource elements is equal to the number of resource elements common to both sets.

In an unplanned deployment, there is in general no way to ensure that the set of resource elements allocated for positioning reference symbols to one eNB will be orthogonal or nearly orthogonal to the set of resource elements allocated to one of its neighbors. In order to protect against the permanent assignment of two different sets of resource elements with large overlap to two adjacent eNBs, it may be desirable for each eNB to randomly or pseudo-randomly re-select the set of resource elements to be used to transmit positioning reference symbols prior to each positioning subframe transmission. If the number of sets of allowed resource allocations is small, then there is a significant likelihood that two adjacent eNBs will select the same resource allocation for the transmission of positioning reference symbols, and in such an instance, it will be difficult for the UE to extract timing information due to the resulting interference. In order to minimize the likelihood that any two eNB's will select the same set of resource elements for the transmission of positioning reference symbols, the number of allowed sets of resource elements should be large, and to the greatest extent possible, these sets should be orthogonal (no overlap) or nearly orthogonal (small overlap).

There are many parameters and issues to consider when defining sets of resource elements for the purpose of transmitting positioning reference symbols, and these include (but are not limited to) the following, all of which are discussed below: (i) the number of OFDM symbols within the positioning subframe containing positioning reference symbols; (ii) the number of subcarriers within a resource block containing positioning reference symbols; (iii) the total number of resource elements allocated for positioning reference symbols within the subframe; and (iv) the complexity of signal generation and detection for the positioning subframes.

A significant problem for TDOA-based location is that it requires the UE be able to "hear" the transmissions of at least 3 eNB's which are not co-sited, and most studies indicate that is the "hearability" problem which limits the performance of TDOA-based location, and this is closely tied to the number of reference symbols containing positioning reference symbols (i). In general, the amount of energy associated with the transmission of the positioning reference symbols within the positioning subframe is proportional to the number of OFDM symbols within the positioning subframe which contain positioning reference symbols. Thus, when defining sets of resource elements for the purpose of transmitting positioning reference symbols, it seems to be advantageous to ensure that each set includes resource elements from each of the symbols.

Another issue to consider when defining sets of resource elements to be allocated for positioning resource elements is the resolution of the resulting time estimate and this is related to the number of subcarriers containing positioning reference symbols (ii) and their distribution throughput the subframe. Several factors contribute to the resolution including the both the width of the autocorrelation peak and the ratio of the autocorrelation peak to the strongest sidelobes. In general, it can be found that in order to minimize the width of the autocorrelation peak, it is sufficient to allocate reference elements for positioning reference symbols in the outermost resource blocks (highest and lowest frequency RBs). However, in order to maximize the ratio of the magnitude autocorrelation peak to that of the sidelobes, it is desirable to allocate resource elements for positioning reference symbol throughout the entire bandwidth. More specifically, it is desirable to select sets of resource elements for positioning reference symbols such that the number of subcarriers within each resource block containing at least one of these resource elements is maximized. In general, it is desirable to maximize the ratio of the magnitude of the autocorrelation peak to the sidelobes as this will minimize the likelihood that a false autocorrelation peak is selected (resulting in an incorrect timing estimate) in the presence of interference and noise.

The total number of resource elements within a set of resource elements allocated for positioning reference symbols (iii) determines the spreading or processing gain achievable against another eNB that is assigned either this same set of resource elements or another set of resource elements which overlaps with this first set. In general, random or pseudo-random spreading or scrambling will be applied to the positioning reference symbols, such that a UE with knowledge of this spreading or scrambling sequence can still extract the time of arrival of the signal from each eNB with some degree of accuracy. As the total number of resource elements allocated for positioning reference symbols is increased, so does the achievable processing gain against other eNB's with either the same or overlapping resource allocations for positioning reference symbols. However, it must be noted that as the number resource elements allocated for positioning reference symbols is increased, the number of orthogonal allocations of resource elements which can be defined is decreased, and the amount of overlap between non-orthogonal allocations is increased. Thus, as the number of resource elements allocated for positioning reference symbols is increased, there is a clear tradeoff between the achievable processing gain and the number of sets of orthogonal or nearly orthogonal resource elements. In an unplanned system, it is the number of such sets of resource elements that will determine the likelihood that two neighboring eNB's select the same set of resource elements for the transmission of positioning reference symbols.

A last issue to consider in the definition of sets of resource elements to be used for the transmission of positioning reference symbols is the complexity of signal generation and detection. In general, there is no simple measure of complexity as it is architecture dependent. Tradeoffs of complexity can be defined separately for the transmitter and the receiver, and may include memory requirements. A further issue to consider is whether signaling support is required to make implementation practical, or if not, the difference in complexity with and without signaling support.

In FIGS. 5-12, various methods are given for defining sets of resource elements to be used for the transmission of positioning reference symbols in positioning subframes. The methods indicated in FIGS. 5-12 and described below take into consideration the design and performance tradeoffs identified in (i-iv) as described above.

In order to simplify the description of the sets of resource elements to be used to transmit positioning reference symbols within a positioning subframe, we define a template matrix having 0-1 entries such that number of rows of the template matrix is equal to the number of subcarriers in a resource element block and the number of columns is equal to the number of OFDM symbols in the subframe. The set of resource elements within a resource block that will be allocated for the transmission of positioning reference symbols are indicated by the locations of the non-zero entries within the template matrix, where the row of a particular non-zero entry denotes the subcarrier and the column of the entry denotes the symbol within the subframe.

FIG. 5 is a block diagram of a method for defining multiple resource element allocations for positioning reference symbols from a base Costas array. A first 0-1 valued intermediate matrix is obtained by cyclically shifting the base Costas array of dimension N×N horizontally and vertically. This first intermediate matrix is then modified to produce a second intermediate matrix by inserting K rows of zeros in between each group of K consecutive rows and by appending K rows of zeros to the top or the bottom of the matrix, where K>1 and K is an integer divisor of N. The template matrix used to define the set of resource elements to be used for the transmission of positioning reference symbols is then set equal to a circular shift of the second intermediate matrix, where the number of cyclic shifts in each dimension of the base Costas array to produce the first intermediate matrix and the vertical shift of the second intermediate matrix are determined from any one of the following: the site identifier of the base station; the physical cell identity of the base station; the global cell identity of the base station; the system frame number; the slot number; the subframe number; the symbol index; the resource element block index; the radio network transaction identity; or information signaled by the serving base station.

Figure 6:
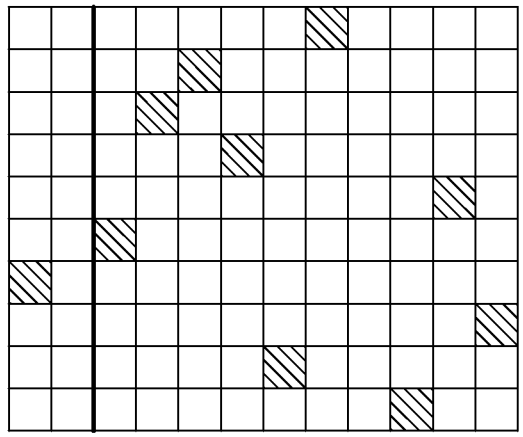
FIG. 6 is a block diagram of a method for pruning columns of a 12×12 Costas array in order to define resource element allocations for positioning reference symbols on a resource block having fewer than 12 non-control symbols.
Figure 6:
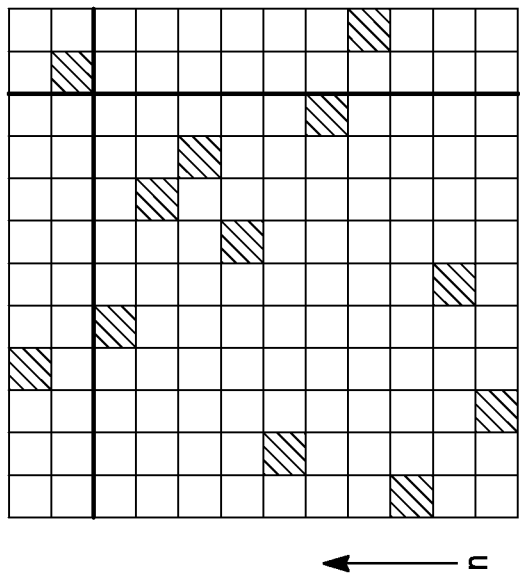

FIG. 6 is a block diagram of a method for pruning columns of a 12×12 Costas array in order to define resource element allocations for positioning reference symbols on a resource block having fewer than 12 non-control symbols. With this method, we define 12 mutually orthogonal sets of resource elements by cyclically shifting the Costas array either horizontally or vertically. The corresponding template matrices are then generated by pruning the last two columns of the cyclically shifted 12×12 Costas matrices. The advantage of this method is that the single base 12×12 Costas array can be used to generate 12 orthogonal sets of resource elements by cyclically shifting the Costas array either horizontally or vertically. If alternatively, a N×N Costas array were to be used, where N<12 is equal to the number of non-control symbols in the subframe, it would only be possible to define K mutually orthogonal sets of resource elements to be used for the transmission of positioning reference symbols. More generally, the 12×12 Costas array can be cyclically shifted horizontally and vertically to define 144 distinct matrices, each of which, after pruning of the last two columns, can be used to define a set of resource elements for the transmission of positioning reference symbols. Conversely, for N<12, a base N×N Costas array can be used to generate at most 121 distinct matrices that can be used to define sets of resource elements for the transmission of reference symbols.

Figure 7:
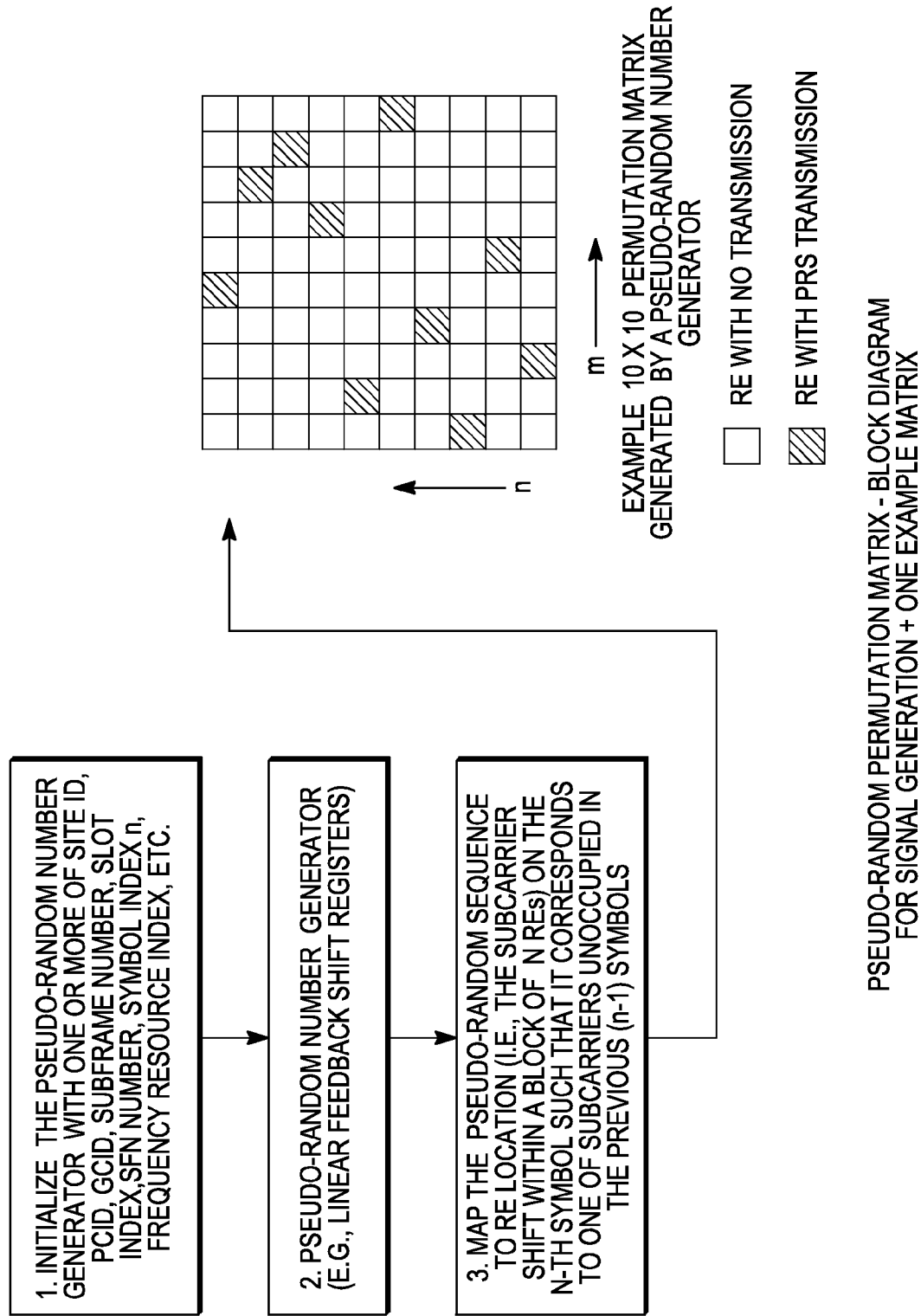
FIG. 7 is a block diagram of a method for allocating resource element locations for positioning reference symbols using a pseudo-randomly selected permutation matrix.

FIG. 7 is a block diagram of a method for allocating resource element locations for positioning reference symbols using a pseudo-randomly selected permutation matrix. In this embodiment, the 0-1 template matrix is a pseudo-random permutation matrix (a square matrix with precisely one non-zero element in each row and column, where the non-zero element is equal to 1). The particular permutation matrix (there are N! permutation matrices for an N×N matrix) is determined from a mapping function of a pseudo-random number generator and any one of the following: the site identifier of the base station; the physical cell identity of the base station; the global cell identity of the base station; system frame number; the slot number; the subframe number; the symbol index; the resource element block index; the radio network transaction identity; or information signaled by the serving base station.

Figure 8:
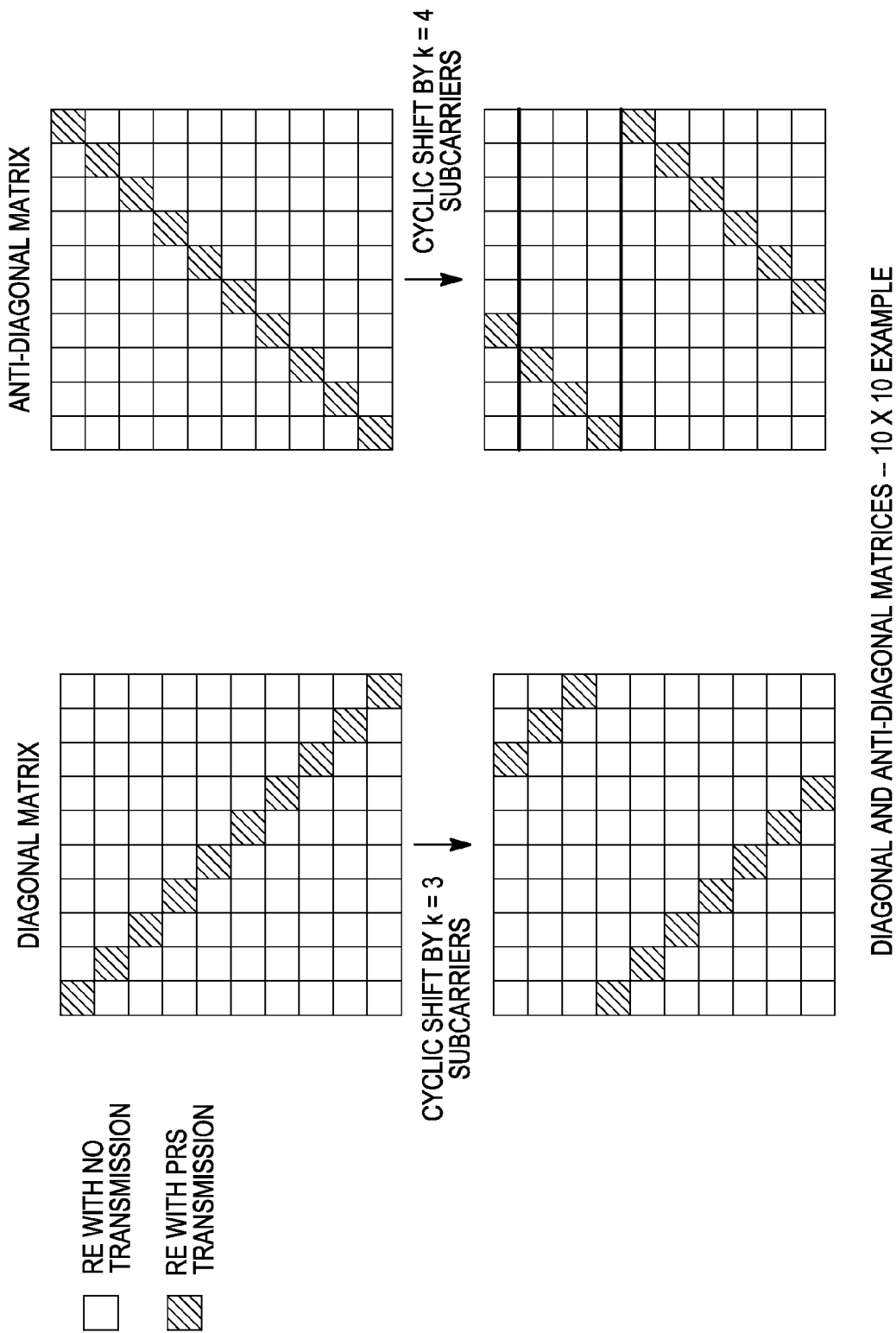
FIG. 8 is a block diagram of a method for allocating resource element locations for positioning reference symbols using matrices which are cyclic shifts of diagonal or anti-diagonal matrices.

FIG. 8 is a block diagram of a method for allocating resource element locations for positioning reference symbols using matrices which are horizontal or vertical cyclic shifts of diagonal matrices. In this embodiment, the 0-1 template matrix is either a cyclically shifted diagonal matrix or a cyclically shifted anti-diagonal matrix, where the amount of cyclic shift is determined from any one of: a site identifier of the base station; a physical cell identity of the base station; a global cell identity of the base station; a system frame number; a subframe number; resource element block index; a radio network transaction identity; or information signaled by the serving base station. Note that the number of orthogonal matrices generated with this method is equal to the dimension of the diagonal matrix.

Figure 9:
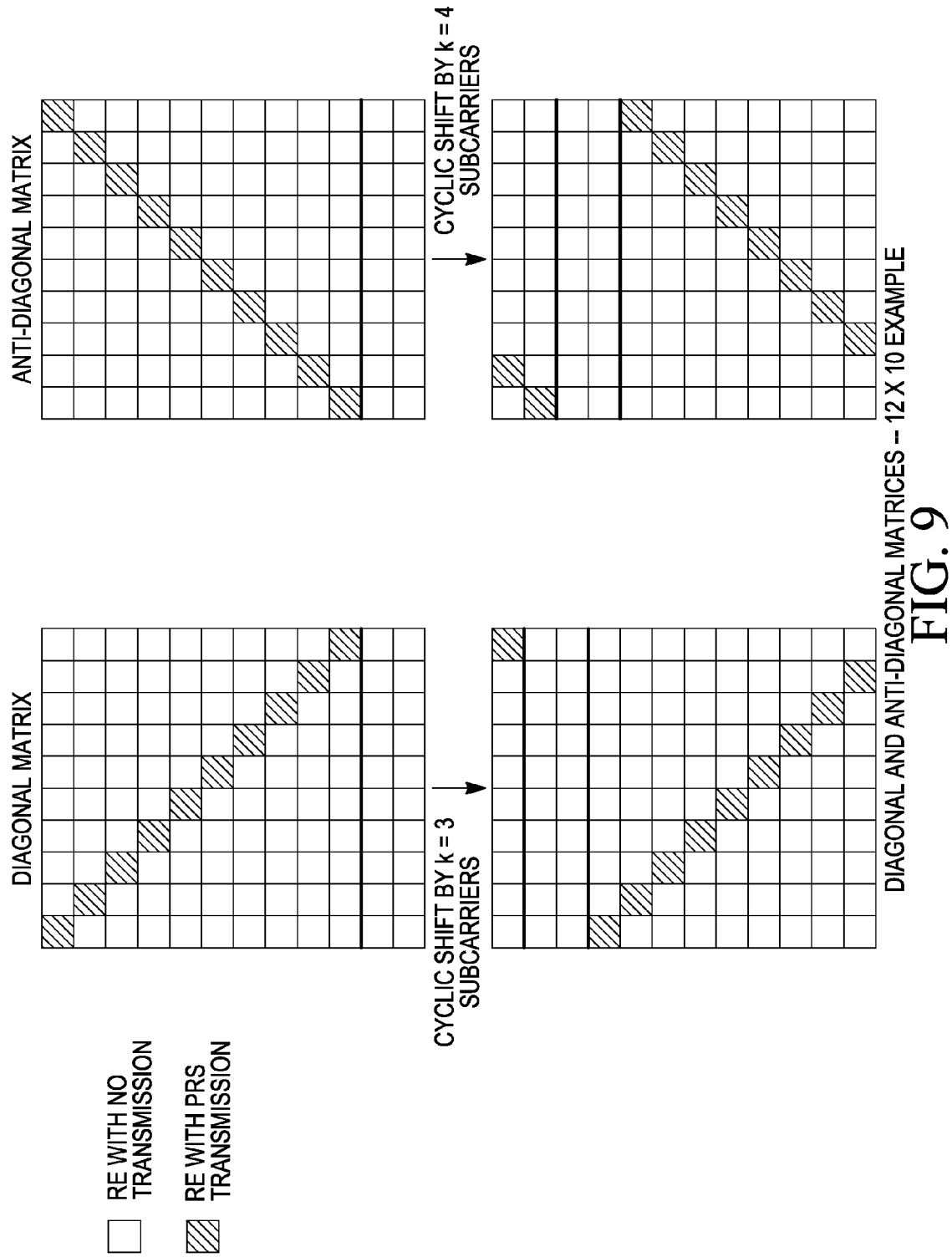
FIG. 9 a block diagram of a method for allocating resource element locations for positioning reference symbols in resource blocks having fewer than 12 non-control symbols by pruning the last columns of matrices which are cyclic shifts of diagonal or anti-diagonal matrices.

FIG. 9 a block diagram of a method for allocating resource element locations for positioning reference symbols in resource blocks having fewer than 12 non-control symbols by pruning the last columns of matrices which are cyclic shifts of diagonal or anti-diagonal matrices. In this embodiment, the 0-1 template matrix is either a cyclically shifted diagonal matrix or a cyclically shifted diagonal matrix from which the last columns have been pruned. Alternatively, the template matrices can be generated by appending two rows of zeros to the bottom of a diagonal or anti-diagonal matrix and generating all possible vertical circular shifts. In this example, the number of orthogonal matrices generated is 12, while the dimension of the diagonal matrix that is shifted is 10.

Figure 10:
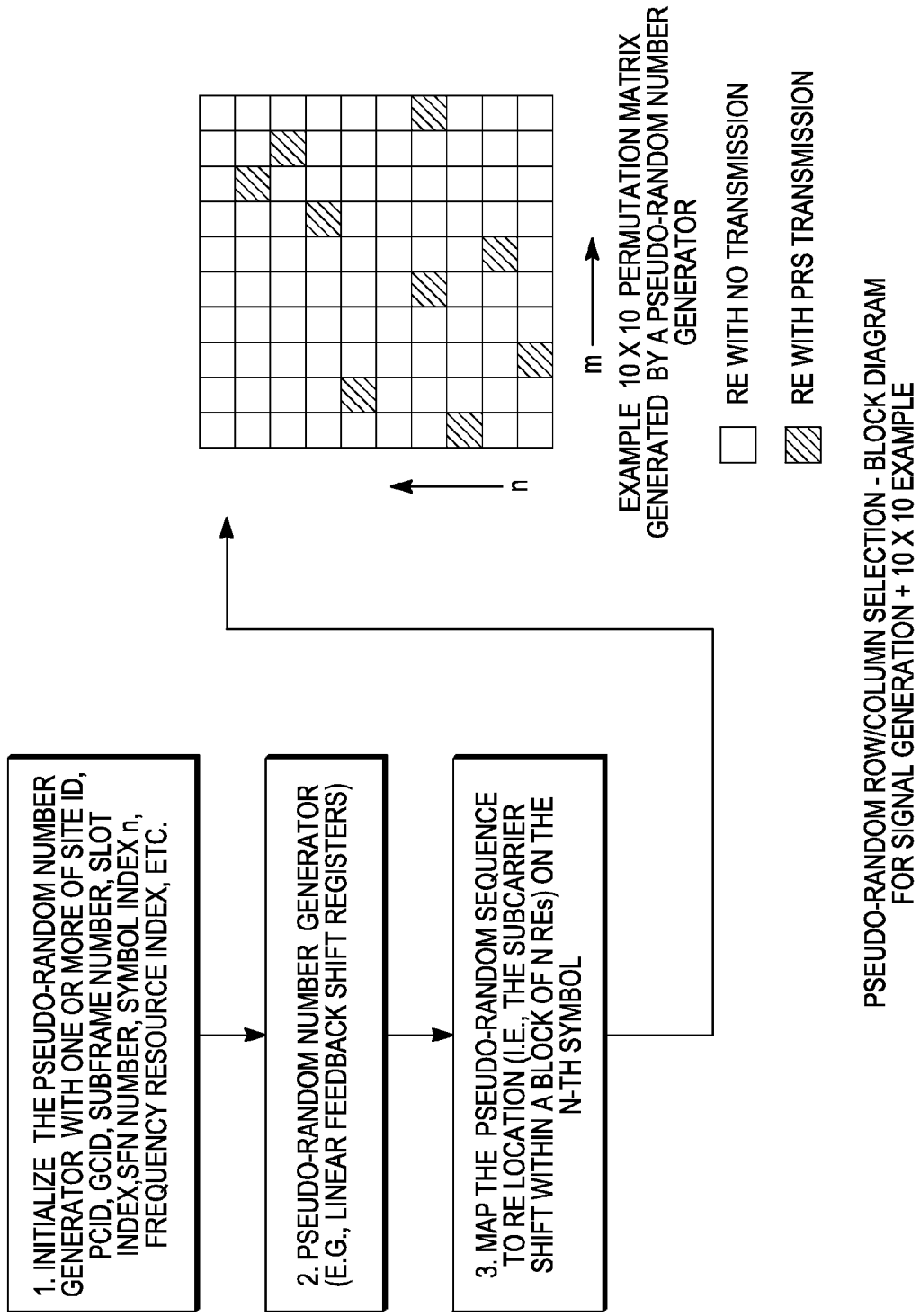
FIG. 10 is a block diagram of a method for allocating resource element locations for position reference symbols by randomly selecting a column for each row of matrix.

FIG. 10 is a block diagram of a method for allocating resource element locations for position reference symbols by pseudo-randomly selecting one column for each row of the matrix and placing a 1 in this location. All other locations in the matrix are zero-valued. In this embodiment, the 0-1 template matrix is determined using a pseudo-random number generator in the manner indicated, where further the pseudo-random number generator uses as its input any one of: the site identifier of the base station; the physical cell identity of the base station; the global cell identity of the base station; the system frame number; the subframe number; the resource element block index; the radio network transaction identity; or information signaled by the serving base station.

Figure 11:
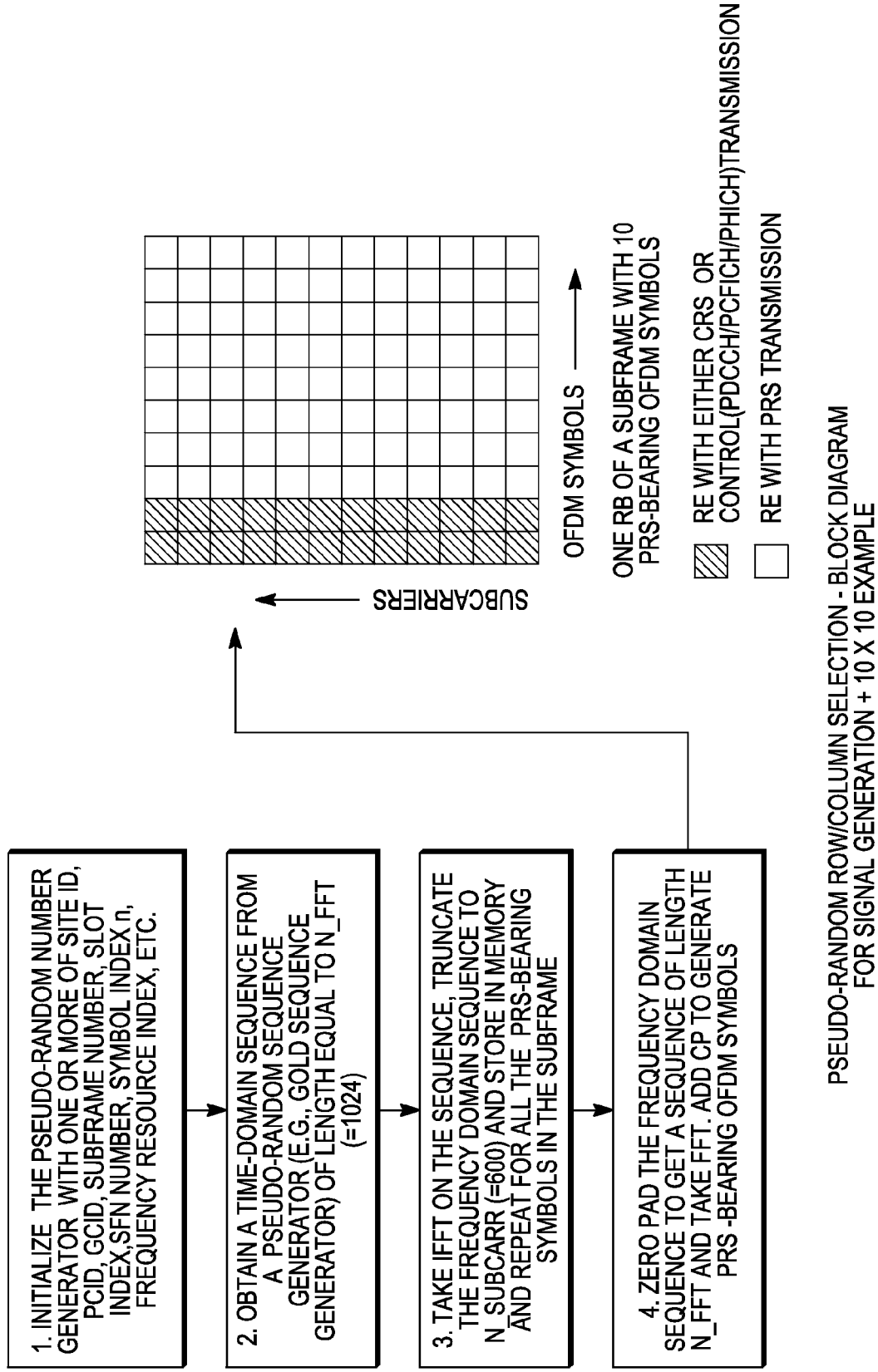
FIG. 11 is a block diagram of a method for using a fast fourier transform and an inverse fast fourier transform to generate a timing reference signal from a time-domain single carrier direct-sequence spread spectrum signal.

FIG. 11 is a block diagram of a method for using a Fast-Fourier transform and an inverse Fast-Fourier transform to generate a timing reference signal from a time-domain single carrier direct-sequence spread spectrum signal. In this embodiment, the reference signal on a first set of OFDM symbols is obtained by taking Fast-Fourier Transform of a time-domain sequence obtained from a pseudo-random sequence generator, where the initialization of the pseudo-random number generator is determined from any one of: a site identifier of the base station; a physical cell identity of the base station; a global cell identity of the base station; a system frame number; a subframe number; a resource element block index; a radio network transaction identity; or information signaled by the serving base station.

Figure 12:
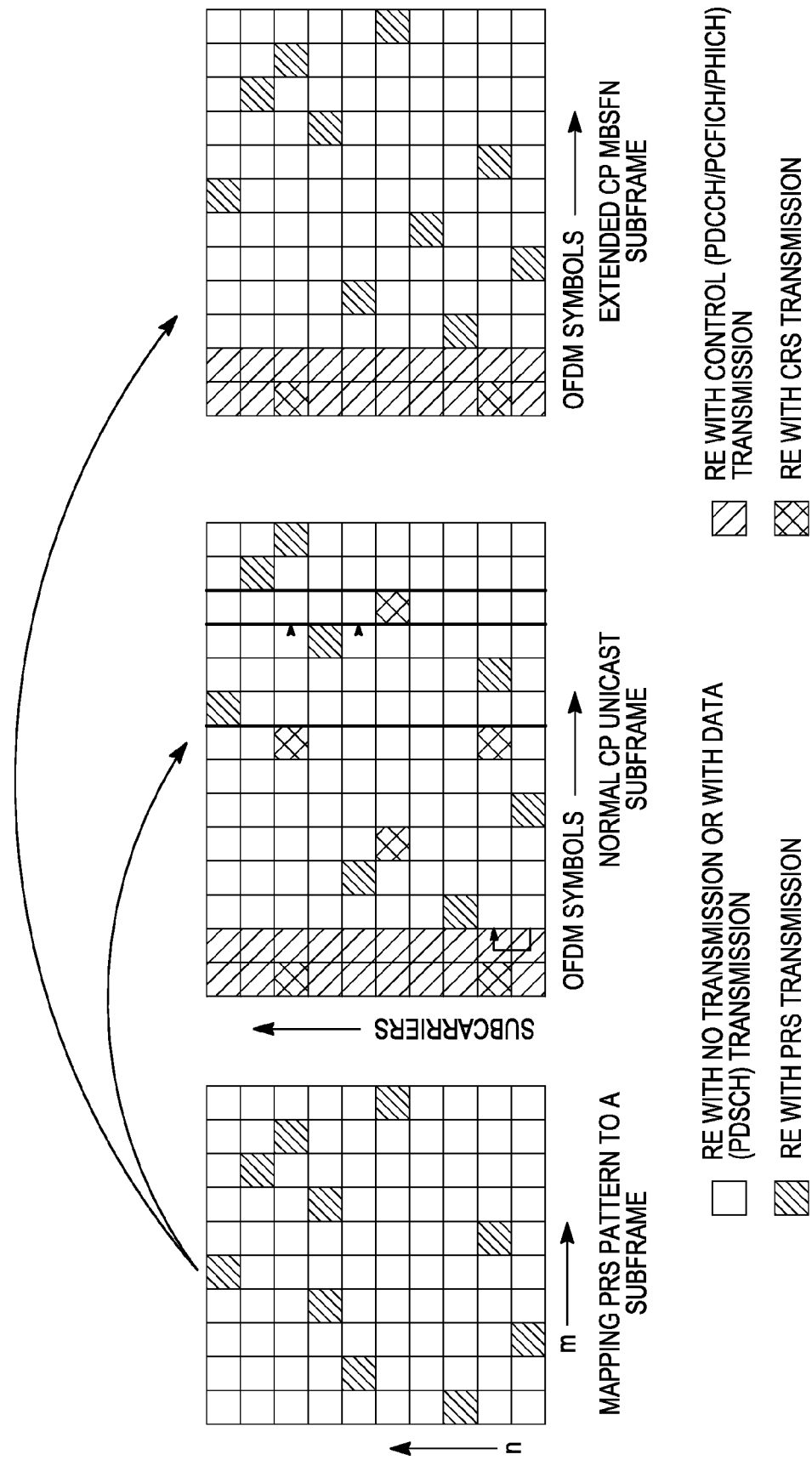
FIG. 12 is a block diagram of a method for mapping positioning reference symbols onto a unicast subframe containing common reference symbols.

FIG. 12 is a block diagram of a method for mapping positioning reference symbols onto a unicast subframe containing common reference symbols. In this particular embodiment, resource elements in OFDM symbols containing CRS are not allocated for the transmission of positioning reference symbols. In general, resource elements in OFDM symbols containing CRS can be allocated for positioning reference symbols, but resource elements used to transmit CRS cannot be used. In an alternate embodiment, the resource elements not used for transmission of either positioning reference signal or the CRS may be used for transmission of data resource elements. The data resource elements may correspond to a sequence of symbols of a PDSCH transmission.

Figure 13:
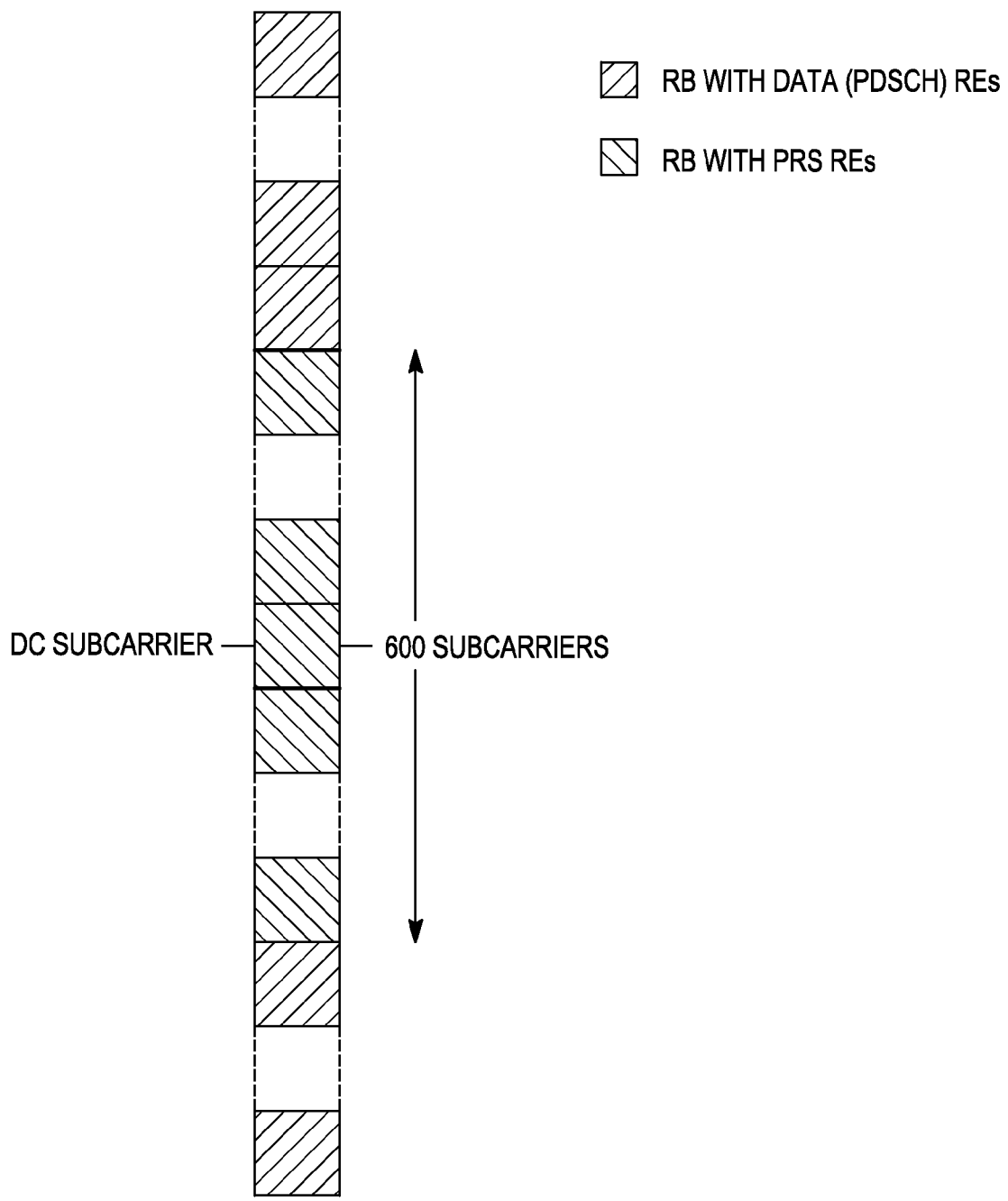
FIG. 13 is a block diagram of a method for combining unicast or multi-cast data in a positioning reference symbols in the same subframe in which the resource blocks furthest from the carrier frequency are used to transmit data and the remaining resource blocks are used to transmit positioning reference symbols.
Figure 14:
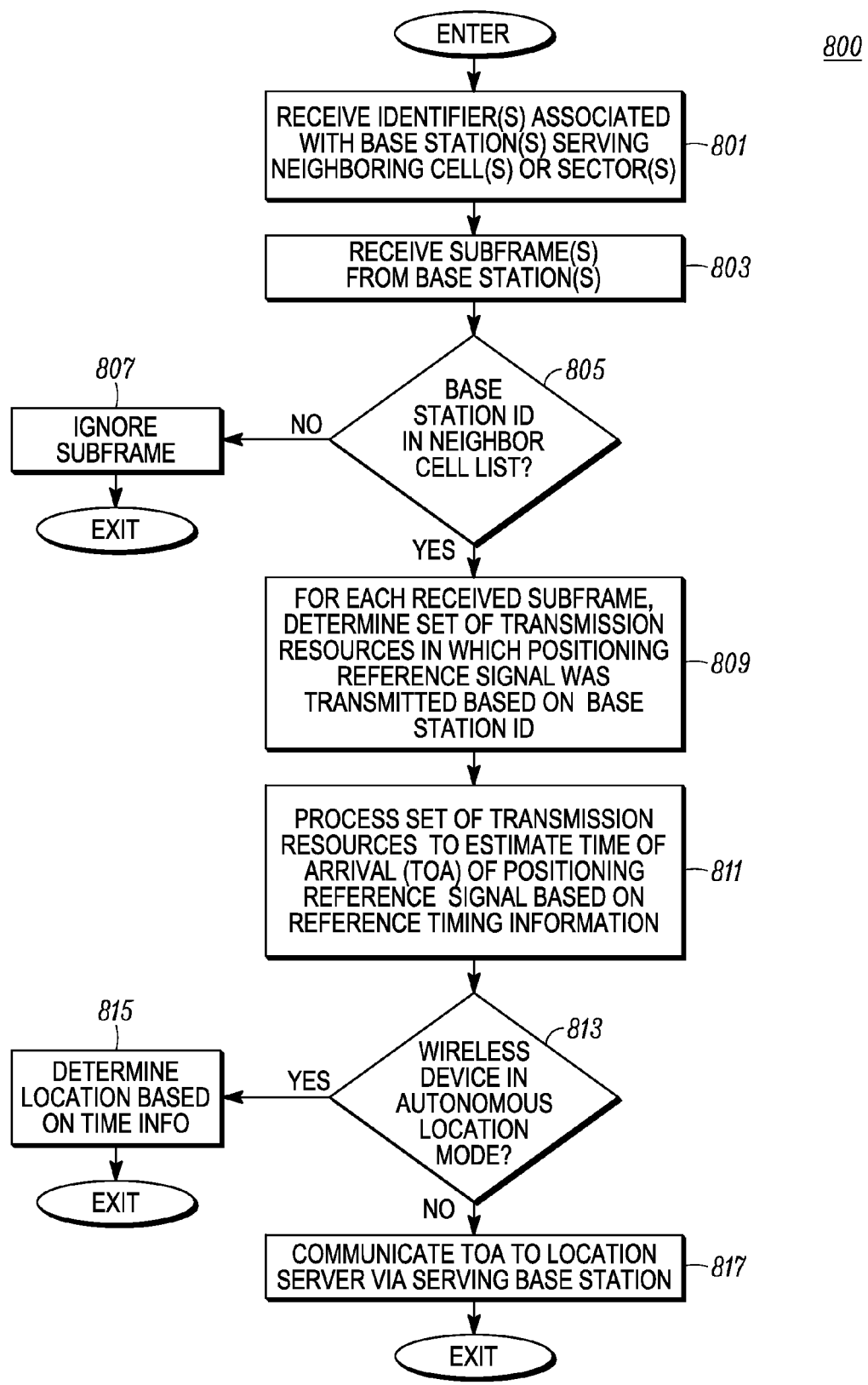
FIG. 14 is a logic flow diagram of steps executed by a wireless communication device to process a downlink subframe containing a positioning reference signal, in accordance with an exemplary embodiment of the present invention.

FIG. 13 is a block diagram of a method for combining unicast or multi-cast data and positioning reference symbols in the same subframe in which the resource blocks furthest from the carrier frequency are used to transmit data and the remaining resource blocks are used to transmit positioning reference symbols. In this particular example, the 600 center resource elements (center 50 resource blocks) of positioning can only be allocated for positioning reference symbols, while the resource elements in resource blocks outside of this region can be used for PDSCH transmissions.

The embodiments in FIG. 7, FIG. 8 and FIG. 10 can be extended to the case of a non-MBSFN subframe (or normal subframe) with either normal CP or with extended CP. PRS cannot be transmitted at maximum power if is transmitted on the same symbol as cell-specific reference signal (CRS) is transmitted. In addition, PRS might have to be transmitted at different powers on different symbols within the same subframe which might be undesirable from an implementation point of view. Therefore, one option is to not transmit PRS on a CRS-bearing OFDM symbol. Assuming that the number of control symbols is two, there are 9 symbols and 7 symbols in a normal CP subframe and in an extended CP subframe, respectively, that do not carry CRS. For these cases, pseudo-randomly generated permutation matrices of order N×N can be used for populating PRS, where N is equal to the number of available OFDM symbols (i.e., without CRS) in each case. N=9 for normal CP and N=7 for extended CP. Once a matrix is chosen for a particular PCID corresponding to a time instant, the PRS pattern is repeated in the frequency domain once every N subcarriers. The number of OFDM symbols available depends both on the number of control symbols in the subframe and on the number of transmit antennas used by the eNB. Table 1 summarizes the number of OFDM symbols available for PRS transmission for the different cases where NCtrl is equal to the number of control symbols in the subframe.

TABLE 1

| Number of symbols N available for PRS transmission | | | |
|---|---|---|---|
| | 1 Tx or 2 Tx | | 4 Tx |
| Subframe Type/CP Type | NCtrl = 1 | NCtrl = 2 | NCtrl = 1 or 2 |
| Normal subframe/Normal CP | 10 | 9 | 8 |
| Normal subframe/Extended CP | 8 | 7 | 6 |
| MBSFN subframe/Extended CP | 11 | 10 | 10 |

For embodiment of FIG. 7, the pseudo-random number generator chooses an element from the set of all possible N! permutation matrices. For the embodiment of FIG. 8, the pseudo-random number generator chooses an element from the set of 2N distinct matrices formed by different cyclic shifts of the diagonal matrix and the anti-diagonal matrix. For the embodiment of FIG. 10, the pseudo-random number generator chooses an element from the set of all possible $N^N$ 0-1 matrices. For the embodiments in FIG. 7, FIG. 8 and FIG. 10, the dimension of the pattern (i.e., N) may be fixed in the specification for a given configuration (e.g., non-MBSFN subframe, extended CP, 2 Tx antenna) as indicated in Table 1 corresponding a fixed number of control symbols (e.g., NCtrl=1 or NCtrl=2).

For transmission of the positioning reference signal, a certain subset of all possible subframes designated as "positioning subframes" can be reserved. Of all the available positioning subframes, a base station may choose to transmit PRS signals on a subset of these subframes to allow for time reuse. A base station may determine whether or not to transmit PRS on a PRS subframe based on either (i) a pseudo-random number generator that uses any one of: a site identifier of the base station; a physical cell identity of the base station; a global cell identity of the base station; a system frame number; a subframe number; or a radio network transaction identity; or alternately based on (ii) a inter-base station coordination message exchanged with another base station. For option (i), the pseudo-random number may, in addition to the listed parameters, be configured as a function of the number of OFDM symbols available for PRS transmission in the PRS subframe. When the positioning reference signal is transmitted on fewer symbols (e.g., for 4 Tx case extended CP non-MBSFN subframe has 6 symbols available compared to 1 Tx/2 Tx MBSFN subframe which has 10), the number of orthogonal patterns is smaller. It might be useful to transmit PRS less often and therefore, the pseudo-random number generator may be configured to generate fewer transmissions of the PRS signals within the reserved subframes.

For the embodiments in FIG. 7, FIG. 8 and FIG. 10, an alternate approach of using the template matrix for transmission of the positioning reference signal resource elements may be used as outlined below. Suppose that there are N non-control OFDM symbols in a positioning subframe. Also, suppose that there are no CRS-bearing OFDM symbols among the non-control OFDM symbols in the subframe. A N×N template matrix is generated as (i) a permutation matrix for the embodiment of FIG. 7, (ii) a shifted diagonal or a shifted anti-diagonal matrix for the embodiment of FIG. 8, or (iii) a 0-1 matrix with pseudo-random row/column selection for the embodiment of FIG. 10. A correspondence from the rows and columns of the template matrix respectively to the subcarriers and non-control OFDM symbols of a resource element block in the positioning subframe is established where a positioning reference signal resource element is transmitted on a subcarrier whose shift is equal to the row index of a non-zero element of the template matrix for each symbol. Next, suppose that there are CRS-bearing OFDM symbols in the non-control region of the subframe. The procedure described earlier can be re-used except that, a subcarrier location determined for positioning reference signal on a given symbol is not used for PRS transmission if it overlaps with a resource element allocated for CRS transmission on that symbol. In other words, PRS transmission is punctured on resource elements designated for CRS. One issue with this approach is that, since some symbols carry both CRS and PRS, the transmission power has to be shared between resource elements corresponding to both CRS and PRS. It would be desirable to transmit PRS at the maximum possible transmit power on symbols not carrying CRS to achieve the best possible hearability. Therefore, the punctured mapping approach may result in the transmission of a positioning subframe with (a) PRS transmission on OFDM symbols not carrying CRS at a first power level, and (b) PRS transmission on CRS-bearing OFDM symbols at a second power level. In such a scenario, it might be beneficial if the user equipment were to know the difference in the two power levels. In one embodiment, the power delta (equal to the difference between the first and the second power levels) can be signaled by the serving base station on a system information broadcast or on a dedicated control message (e.g., radio resource control message). The user equipment may use this information to aid its receiver processing towards estimation of time-difference of arrival.

The positioning reference signals (e.g., observed time difference of arrival (OTDOA) waveforms) from neighboring base stations 203, 205 can be used jointly such that there is time-domain separation between transmissions of such signals from neighboring base stations 203, 205. Further, not all of the subcarriers or resource elements on the OFDM symbols carrying the positioning reference signal may be used for transmission. The set of resource elements carrying the positioning reference signal in an OFDM symbol may determined as a function of an identifier associated with the transmitting base station which may be derived from at least one of a physical cell identifier (PCID), a base station identifier, a cell site ID, a global cell identifier (GCID), a system frame number (SFN), a symbol index, a slot index, a subframe index, a radio network transaction identifier (RNTI) or any other applicable identifier. To enhance the timing extraction support from the positioning reference signal, the sequence of symbols used for encoding the transmission resources corresponding to the positioning reference signal may be generated in a way to avoid secondary cross-correlation peaks. Gold sequence generators may be used for generating an in-phase (I) stream and a quadrature (Q) stream of and a QPSK sequence may be constructed from the I-Q streams. The initializers or the seeds for the registers in the Gold sequence generator may be derived from an identifier associated with the base station. The identifier may be derived from at least one of a physical cell identifier (PCID), a base station identifier, a cell site ID, a global cell identifier (GCID), a system frame number (SFN), a symbol index, a slot index, a subframe index, a radio network transaction identifier (RNTI) or any other applicable identifier. Further, such an identifier may be used to derive an offset that is used as the starting point of extraction of a subsequence from the so-derived QPSK sequence. This QPSK sequence may then be used for encoding the transmission resources used for transmitting the positioning reference signal. In another example, an orthogonal set of time-frequency resources for transmission of positioning reference symbols (PRS) may be identified for use in a set of coordinating base stations. Thus, coordinating base stations can orthogonalize their PRS transmissions by selecting different indices into the orthogonal set of time-frequency resources and this index may also be considered as part of the identifier.

Those of ordinary skill in the art will readily appreciate and recognize that various other time and frequency re-use approaches for communicating positioning reference signals in overlapping or non-overlapping time resources can be envisioned taking into account the principles described herein and particularly above with respect to the subframe structures illustrated in FIGS. 5-13. Accordingly, the exemplary subframe structures discussed above with respect to FIGS. 5-13 are merely illustrative in nature and should not be construed or used to limit the present invention as defined by the appended claims.

Referring now to FIGS. 2, 3 and 5-13, operation of an exemplary wireless communication device 201 to process subframes (containing positioning reference signals in accordance with one embodiment of the present invention will be described. Prior to receipt of subframes containing positioning reference signals, the wireless device receiver 327 receives (801), from a base station serving the service coverage area in which the wireless device 201 is located (serving base station), one or more identifiers associated with the base stations that will be transmitting the subframes, particularly identifiers associated with base stations serving service coverage areas (e.g., cells or sectors) neighboring the service coverage area in which the wireless communication device 201 is presently located. The identifiers may be, for example, beacon codes or identifiers, offset identifiers, base station identifiers, cell site identifiers, PCIDs, GCIDs, subframe indexes, SFNs, and/or a RNTIs and may have been received as part of a broadcast control message, such as an MIB or SIB, from the serving base station. For example, the identifiers associated with the base stations 203, 205 serving neighboring service coverage areas may have been communicated as part of a neighbor cell list transmitted from the wireless device's serving base station 204 (assuming, for example, that the wireless device 201 is being serviced by base station 204 in FIG. 2). Alternatively, the identifier may be encoded into a subframe containing the positioning reference signal (e.g., PDCCH or other control information contained in the subframe).

In addition to receiving identifiers associated with base stations serving neighboring service coverage areas (neighbor base stations), the wireless communication device receiver 327 receives (803) one or more subframes containing positioning reference signals from one or more base stations (e.g., base stations 203 and 205). For example, the wireless device 201 may receive a subframe as illustrated in FIGS. 5-7. The receiver 327 provides a baseband version of the received subframe to the processor 329 for processing in accordance with the present invention. The processor 329 first extracts a base station identifier or another identifier associated with the base station before it can receive the subframe bearing the positioning reference signal. The processor 329 may receive the identifier together with a neighbor cell list or other list of identifiers associated with neighbor base stations.

Upon receiving the subframe, the wireless device processor 329 determines (805) whether the subframe originated from a base station from which the wireless device processor 329 can process a positioning reference signal to estimate timing information (e.g., time of arrival information) useful in determining a location of the wireless device 201 and whether the subframe contains a positioning reference signal. The positioning reference signal may not be transmitted on all subframes, but rather may be transmitted in a certain subset of all subframes used for transmission by the base station. The base station may indicate to the wireless device 201 which subframes bear the positioning reference signal. The base station may indicate which subframes are used for positioning reference signal transmission through a second identifier associated with the base station. This second identifier may be pre-determined (e.g., specified in a 3GPP specification), or alternately included in a system broadcast message or a UE-specific control message (e.g., radio resource control measurement configuration message) by the base station. Subsequently, the wireless device processor 329 can determine whether a subframe contains a positioning reference signal or not. Further, it can process a positioning reference signal on subframes that carry such a signal to estimate timing information (e.g., time of arrival of the first multipath component from the base station) useful in determining a location of the wireless device 201. When either identifier indicates that either the subframe does not contain a position reference signal or that the information within the subframe (e.g., a positioning reference signal) cannot be used for determining position-related timing information (e.g., the identifier does not correspond to a desired base station), the processor 329 ignores (807) the received subframe. On the other hand, when the identifier indicates that information within the subframe (e.g., a positioning reference signal) can be used for determining position-related timing information (e.g., the identifier is on a previously received neighbor cell list), the processor 329 processes the subframe and particular sets of transmission resources therein to ultimately estimate timing information (e.g., time of arrival or observed time difference of arrival information) that may be used in determining a location of the wireless device 201.

In the event that the received subframe is from a base station from which position-related timing information can be determined, the wireless device processor 329 determines (809) a set of transmission resources in a non-control channel portion of the received subframe in which a positioning reference signal (e.g., an OTDOA waveform) was transmitted based on an identifier associated with the base station. For example, the wireless device memory 331 may store a table that maps identifiers with OFDM symbol positions and characteristics (e.g., symbol durations and/or associated cyclic prefixes). The table may be updated each time the wireless device 201 receives a new neighbor cell list from the currently serving site or cell or when a new cell is detected and the neighbor cell list is updated by the wireless device 201 in an autonomous fashion.

Based on the identifier (e.g., PCID) associated with the base station from which the subframe was received, the wireless device processor 329 demultiplexes the subframe to extract the set of transmission resources (e.g., time-frequency resource elements) carrying the positioning reference signal. In other words, based on the identifier associated with the base station that transmitted the subframe and the symbol mapping stored in the wireless device memory 331, the processor 329 determines which OFDM symbol or symbols in the non-control channel portion of the frame contains the positioning reference signal. Additionally, the processor 329 determines, based on the stored mapping, whether the OFDM symbol or symbols containing the positioning reference signal are of normal duration or normal or extended cyclic prefix under the E-UTRA or LTE standard or have a special duration or associated cyclic prefix (e.g., a multiple of a normal duration or a special, lengthier cyclic prefix). The processor 329 then processes (811) the set of transmission resources containing the positioning reference signal to estimate time of arrival information associated with the positioning reference signal based on reference timing information. For example, the wireless device processor 329 may determine a time of arrival of the positioning reference signal based on a reference time or clock supplied by the wireless device's local oscillator 332. Further, the wireless device processor 329 may determine time of arrival from at least two base stations from their respective positioning reference signal transmissions based on a reference clock. In addition, the device processor 329 may compute the time difference of arrival corresponding to at least a subset of those base stations with the time of arrival of one base station as the reference.

In one embodiment, after the transmission resources containing the positioning reference signal have been processed and the timing information estimated, the wireless device processor 329 may determine (813) whether the wireless device 201 is in an autonomous location determining mode in which the wireless device processor 329 determines the wireless device's location. If the wireless device 201 is in such an autonomous location mode, the wireless device processor 329 determines (815) the wireless device's location based on the timing information computed for subframes received from multiple (two or more) base stations serving neighboring service coverage areas. In this case, the wireless device memory 331 stores the fixed locations of the system base stations and uses those fixed locations together with time of arrival information to determine its location using known triangulation or trilateralization methods. Alternatively, if the wireless device 201 is not in an autonomous location determining mode and its location is to be determined by another device, such as the wireless system's location server 207, the wireless device communicates (817) the timing information (e.g., estimated times of arrival of positioning reference signals received from two or more neighbor base stations) to the location-determining device via the wireless device's serving base station. The wireless device in 201 may identify newly detectable cells on a certain carrier frequency autonomously and send a measurement report to a base station to which it is connected. Alternatively, the base station may send a neighbor cell list re-configuration message to the UE. Either way, the wireless device 201 may update its neighbor cell list. A base station may send a UE-specific configuration message (e.g., radio resource control measurement configuration message) requesting the wireless device 201 to determine the observed time difference of arrival corresponding to a subset of the neighboring base stations and report them. When the wireless device 201 may receive and decode such a message and in response to it, determine the observed time difference of arrival corresponding to the subset of the configured neighboring base stations. The wireless device may then report these measurements to the base station it is connected to.

To provide a further example of the operation of the wireless device processor 329 to assist in determining the wireless device's location, consider the system 200 of FIG. 2 under the circumstances in which base station 204 is providing wireless service to the wireless device 201 and base stations 203 and 205 are providing wireless service to service coverage areas (e.g., cells or sectors) neighboring the service coverage area serviced by base station 204. In this case, the wireless device may receive subframes from both neighbor base stations 203, 205 In this embodiment, each subframe includes a one millisecond (1 ms) block of resource elements that are divided in time across a group of subcarriers to form OFDM symbols. Each resource element occupies a predetermined amount of time (e.g., about 70 microseconds) on its respective subcarrier. The OFDM symbols of each subframe are arranged into a first set of OFDM symbols into which control information has been encoded and a second set of OFDM symbols into which information other than control information has been encoded. Such other information includes a positioning reference signal. In other words, each subframe may be configured to support a control channel (e.g., PDCCH) and a synchronization channel (e.g., a P/S-SCH).

After receiving the subframes, the wireless device processor 329 determines, for each subframe, a set of resource elements (and analogously a set of OFDM symbols) in which a positioning reference signal was transmitted based on an identifier associated with the base station 203, 205 from which the particular subframe was received. The set of OFDM symbols carrying the positioning reference signal from base station 203 is preferably orthogonal to the set of OFDM symbols carrying the positioning reference signal from base station 205. The difference in positioning of the positioning reference signal resource elements and/or OFDM symbols either in time or frequency is stored in the wireless device memory 331 and may be updated on a regular basis in connection with receipt of updated neighbor cell lists from the serving base station 204. As a result, the wireless device processor 329 may map the identifier of the base station 203, 205 that transmitted the subframe to the stored information mapping identifiers associated with base stations to positioning of resource elements and/or OFDM symbols carrying positioning reference signals to determine the location and/or characteristics (e.g., duration and/or cyclic prefix) of such resource elements and/or OFDM symbols within a particular received subframe.

After the wireless processor 329 has determined the sets of resource elements in which the positioning reference signals were transmitted in the subframes received from the base stations 203, 205 based on identifiers associated with the base stations 203, 205, the wireless device processor 329 processes the sets of resource elements to estimate times of arrival of the respective positioning reference signals based on a local oscillator frequency of the wireless device's local oscillator 332. The wireless device processor 329 then provides the estimated times of arrival in an message (e.g., in a radio resource control measurement report message transmitted by the wireless device 201 on the uplink) to the wireless device transmitter 325 for transmission to the serving base station 204 and ultimately communication to the location server 207 for determination of the wireless device's location. Alternatively, as discussed above, when the wireless device processor 329 has been programmed to autonomously estimate the wireless device's location, the wireless device processor 329 may compute its own location based on the estimated times of arrival and other information as may be provided to the wireless device 201 and/or stored in the wireless device memory 331 (e.g., base station locations, transmission times of the subframes, channel conditions, and so forth as is known in the art).

The instructions illustrated in FIG. 7 for controlling operation of the base station processor 316 (e.g., 401-413) logic flow blocks may be implemented as programming instructions, which are stored in base station memory 318 and executed at appropriate times by the base station processor 316. Similarly, the instructions illustrated in FIG. 8 for controlling operation of the wireless device processor 329 (e.g., logic flow blocks 805-815) may be implemented as programming instructions, which are stored in wireless device memory 331 and executed at appropriate times by the wireless device processor 329.

As detailed above, embodiments of the present disclosure reside primarily in combinations of method steps and apparatus components related to communicating positioning reference signals to aid in determining a geographic location of a wireless communication device. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this disclosure, relational terms such as "first" and "second," "top" and "bottom," and the like may be used solely to distinguish one entity or action from another entity or action without necessarily requiring or implying any actual such relationship or order between such entities or actions. The terms "comprises," "comprising," and any other variations thereof are intended to cover a non-exclusive inclusion, such that a process, method, article, or apparatus that comprises a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the base station 301 and the wireless communication device 201 described herein may be comprised of one or more conventional processors and unique stored program instructions that control the processor(s) to implement, in conjunction with certain non-processor circuits, some, most, or all of the functions of the base station 301 and the wireless communication device 201 and their operational methods as described herein. The non-processor circuits may include, but are not limited to, the transmitters 312, 325, the receivers 314, 327, the antennas 304-307, 39-310, 320, 322-323, the local oscillator 332, the display 333, the user interface 335, memory 318, 331, and the alerting mechanism 337 described above, as well as filters, signal drivers, clock circuits, power source circuits, user input devices, and various other non-processor circuits. As such, the functions of these non-processor circuits may be interpreted as steps of a method in accordance with one or more embodiments of the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless terminal, the method comprising:
identifying a positioning subframe that may contain a positioning reference signal ("PRS") transmitted by a first base station based on information signaled from a serving base station, the positioning subframe comprising OFDM symbols over which a transmission corresponds to resource elements arranged on a subcarrier-OFDM symbol grid;
determining whether the identified positioning subframe contains resource elements corresponding to the positioning reference signal based on information signaled from the serving base station;
receiving the identified positioning subframe;
estimating a time of arrival of the received positioning subframe based on the PRS contained in the received positioning subframe; and
receiving the positioning reference signal on a first set of OFDM symbols where the positioning reference signal resource elements are obtained by taking Fast-Fourier Transform of a time-domain sequence obtained from a pseudo-random sequence generator;
wherein initialization of the pseudo-random number generator is determined from any one of: a site identifier of the serving base station, a physical cell identity of the serving base station, a global cell identity of the serving base station, a system frame number, a subframe number, a resource element block index, a radio network transaction identity, and information signaled by the serving base station.

2. The method of claim 1 further comprising:
estimating a time of arrival of the transmission from the first base station relative to a reference dock based on the positioning reference signal;
estimating a time of arrival of a transmission from a second base station;
computing a time difference of arrival of the transmission from the first base station relative to the transmission from the second base station; and
sending a measurement report to the second base station including at least the time-difference of arrival and an identifier associated with the first base station.

* * * * *